United States Patent
Bannai et al.

(10) Patent No.: US 7,284,851 B2
(45) Date of Patent: Oct. 23, 2007

(54) INKJET RECORDING INK, RECORDING PROCESS AND RECORDING APPARATUS

(75) Inventors: Akiko Bannai, Tokyo (JP); Kiyofumi Nagai, Tokyo (JP); Akihiko Gotoh, Kanagawa (JP); Mariko Kojima, Tokyo (JP); Michihiko Namba, Kanagawa (JP); Tomohiro Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 272 days.

(21) Appl. No.: 11/066,224

(22) Filed: Feb. 28, 2005

(65) Prior Publication Data

US 2005/0231575 A1 Oct. 20, 2005

Related U.S. Application Data

(63) Continuation of application No. PCT/JP2004/009496, filed on Jun. 29, 2004.

(30) Foreign Application Priority Data

Jun. 30, 2003 (JP) .............................. 2003-187127
May 31, 2004 (JP) .............................. 2004-160446

(51) Int. Cl.
 *G01D 11/00* (2006.01)
(52) U.S. Cl. ........................ 347/100; 347/95; 106/31.13
(58) Field of Classification Search ................ 347/100, 347/95, 96, 101; 106/31.6, 31.27, 31.13; 523/160
See application file for complete search history.

(56) References Cited

U.S. PATENT DOCUMENTS 6,695,443 B2 2/2004 Arita et al.

2005/0231575 A1 10/2005 Bannai et al.

FOREIGN PATENT DOCUMENTS

| EP | 1 243 625 A1 | 9/2002 |
|---|---|---|
| EP | 1 262 529 A1 | 12/2002 |
| JP | 2001-262025 | 9/2001 |
| JP | 2002-256187 | 9/2002 |
| JP | 2002-265831 | 9/2002 |
| JP | 2002-285047 | 10/2002 |
| JP | 2003-003098 | 1/2003 |

OTHER PUBLICATIONS

U.S. Appl. No. 10/593,345, filed Sep. 19, 2006, Namba et al.
U.S. Appl. No. 11/575,169, filed Mar. 13, 2007, Namba et al.

*Primary Examiner*—Manish S. Shah
(74) *Attorney, Agent, or Firm*—Oblon, Spivak, McClelland, Maier & Neustadt, P.C.

(57) ABSTRACT

A recording ink including a colorant dispersible in water, a humectant, a surfactant, and a wetting agent, wherein the rate of viscosity increase associated with evaporation of moisture in the recording ink is 5.0 mPa·s/% or less while the evaporated moisture content is less than 30% by weight based on the whole weight of the recording ink, the rate of viscosity increase associated with evaporation of moisture exceeds 50 mPa·s/% while the evaporated moisture content is 30 to 45% by weight, and the average particle size of the colorant in the recording ink is less than five times the average particle size of the colorant in the initial recording ink, and is 0.8 μm or less, at the stage of the recording ink when the rate of viscosity increase amounts to 50 mPa·s/%, wherein the rate of viscosity increase associated with evaporation of moisture (mPa·s/%) is defined as the increment of viscosity (mPa·s) versus the increment of evaporated moisture content (%).

16 Claims, 10 Drawing Sheets

INKJET RECORDING INK, RECORDING PROCESS AND RECORDING APPARATUS

CROSS-REFERENCE TO RELATED APPLICATIONS

This is a continuation of Application No. PCT/JP2004/009496, filed on Jun. 29, 2004.

BACKGROUND OF THE INVENTION

1. Field of the Invention

The present invention relates to an inkjet recording ink and ink cartridge, and recording process and recording apparatus that employ the ink respectively. Specifically, the present invention relates to an ink that provides superior image quality and high-speed printing ability in combination with plain paper, as well as storage stability and discharging stability, and an ink cartridge, recording process and recording apparatus that employ the ink respectively.

2. Description of the Related Art

Inkjet printers have been recently developing their market owing to their attracting features that printing is possible on plain paper, color printing is easily conducted, the size is miniaturized, the price is inexpensive, and the running cost is relatively low.

The typical properties demanded for the inkjet recording ink are those for achieving high image quality as tonality, image density, and bleeding; those for attaining reliability as dissolving or dispersing stability of colorant in the ink, storage stability of the ink, and discharging stability of the ink; those for assuring the reserving ability of recorded images as resistance to water and resistance to light; and those for accomplishing high-speed printing as rapid drying of ink. Various improvements have been proposed heretofore in order to realize these properties.

Traditionally, the colorants of the inkjet recording ink were mainly based on dyes owing to their superior coloring property and high reliability; recently, ink components containing pigments such as carbon blacks have been interested for the purpose to provide recorded images with resistance against light and water.

Further, the size of ink drops is going into smaller nowadays, therefore, the nozzle size is also going into smaller, in order to achieve higher image quality as well as higher speed printing.

However, it is considerably difficult to assure discharging stability when pigments are employed for the colorant and printers with smaller size of nozzles are utilized. As such, inkjet recording inks that satisfy these requirements with other necessary properties have not been developed yet.

Previously, for the purpose to enhance the reliability of printers, one way to solve the problem was to provide an ink composition that suppress the viscosity increase with time as low as possible. For example, Japanese Patent Application Laid-Open (JP-A) No. 2002-337449 discloses that suppressing the viscosity change of ink to less than ten times and the particle size change to less than three times, when the concentration of the ink is condensed to two times compared with beginning, result in the facts that the pigment coagulation may prevent the spread of ink and also may prevent the occurrences of the pore region on which ink is not printed. However, in the proposed ink, it is found to be difficult to form high quality images on plain paper.

Further, JP-A No. 2000-95983 discloses an ink, wherein the remainder after vaporizable ingredients in the ink are vaporized is still liquid, and the viscosity of the remainder is less than 10 times that of the beginning. However, the ink is based on dyes, the image quality on plain paper is relatively inferior even though the reliability is high.

Further, JP-A No. 09-111166 discloses an ink, wherein the viscosity of the remainder after moisture in the ink being vaporized at 60° C. is less than ten times that of prior to the vaporization. However, the ink is also based on dyes, the water resistance is insufficient, even though the reliability of ink and the durability of image quality are balanced through an addition of water-soluble polymer.

Further, JP-A No. 2001-262025 proposes that an ink with higher viscosity (5 to 15 mPa·s) is necessary to ensure high quality images. According to the proposal, the vaporizing rate should be adjusted at an initial period to assure reliability and specific compounds should be added as viscosity controller to adjust the viscosity. However, any description is not present concerning the particle size stability of the pigment to be employed, and the reliability is considered to be inferior when it is left to stand for a prolonged period in certain configuration and size of head and nozzle, although it is described that the reliability after 24 hours is assured.

As explained above, in order to assure high quality of printed images under relatively rapid printing velocity, inks with high viscosity are to be handled successfully, however, such inks with high viscosity are not able to be handled properly, since such inks are typically difficult to assure the reliability in the prior art.

SUMMARY OF THE INVENTION

The present invention relates to a recording ink comprising a colorant dispersible in water, a humectant, a surfactant, and a wetting agent, wherein the rate of viscosity increase associated with evaporation of moisture in the recording ink is 5.0 mPa·s/% or less while the evaporated moisture content is less than 30% by weight based on the whole weight of the recording ink, the rate of viscosity increase associated with evaporation of moisture exceeds 50 mPa·s/% while the evaporated moisture content is 30 to 45% by weight, and the average particle size of the colorant in the recording ink is less than five times the average particle size of the colorant in the initial recording ink and is 0.8 μm or less, at the stage of the recording ink when the rate of viscosity increase amounts to 50 mPa·s/%, wherein the rate of viscosity increase associated with evaporation of moisture (mPa s/%) is defined as the increment of viscosity (mPa·s) versus the increment of evaporated moisture content (%).

The feature of the ink according to the present invention is that the viscosity of the ink does not increase practically till the evaporated moisture content amounts to 30% by weight based on the whole weight of the recording ink, i.e. the rate of viscosity increase is 5.0 mPa·s/% or less, whereas the viscosity of the ink does increase rapidly while the evaporated moisture content is 30 to 45% by weight, i.e. the rate of viscosity increase exceeds 50 mPa·s/%.

Owing to the feature, i.e. the ink according to the present invention is formulated as above described, the ink may increase its viscosity due to the moisture evaporation during the period of after being discharged from the nozzle and before arriving to the paper, as well as at the moment of arriving to the paper, thereby high quality images may be formed even on plain paper.

The ink of which the viscosity increases significantly while the evaporated moisture content is less than 30% by weight often exhibits poor discharging stability, whereas the ink of which the viscosity increases while the evaporated moisture content is more than 45% by weight tends to cause the bleeding, since the viscosity is lower when the ink is applied on the paper. Further, by means of designing the ink such that the alternation of average particle size is reduced even at the stage when a rapid viscosity increase appears, the reliability on short and long periods may be assured.

In the present invention, the term "rate of viscosity increase" means the value calculated as follows, and its unit is mPa·s/%:

Rate of Viscosity Increase=[(viscosity after moisture evaporation (mPa·s))−(viscosity before moisture evaporation (mPa·s))]÷(associated moisture evaporation (%)).

Further, the term "evaporated moisture content" means the value calculated as follows, and its unit is percentage (%):

(weight loss due to moisture evaporation)÷(total weight of ink before moisture evaporation)× 100.

Further, the term "average particle size" indicates volume-average particle size, i.e. the particle size at which the cumulative volume of particles amounts to 50% by volume. As for the method to determine the volume-average particle size, dynamic light scattering or Doppler light scattering analysis may be applied wherein laser beam is irradiated to particles under Brownian movement in an ink, and the frequency fluctuation of the radiation returned from the particles i.e. backscattering is analyzed to determine the particle size.

The components to prepare the ink that satisfies the feature according to the present invention include essentially a colorant, a humectant, a surfactant, and a wetting agent, wherein the combination and blending ratio of these components are important. Further, the addition of specific pH controlling agent as a pigment-coagulation inhibitor may make possible to provide an ink that affords higher quality images and higher reliability.

Concerning an exemplary standard to formulate "the viscosity of the ink does increase rapidly while the evaporated moisture content is 30 to 45% by weight" as described above, humectants with much higher boiling point and much higher viscosity than those of water as well as humectants with somewhat higher boiling point and somewhat higher viscosity than those of water are prepared, then water and these humectants are successfully blended, but not limited to. Otherwise, the applications based on orientation or hydrogen bonding in a liquid, and higher equivalent moisture content may be effective; in addition, examinations as to the amount of added colorant, affinity against various solvents, effects of added surfactant and wetting agent may be desirable. For example, in some instances, lower glycol such as ethylene glycol or lower alcohol, utilized for humectants conventionally, is not preferred to be incorporated 80% or more by weight of the whole humectant, unless the lower glycol or alcohol is combined with other humectants having a higher boiling point and higher viscosity.

DESCRIPTION OF THE PREFERRED EMBODIMENTS

Figure 1:
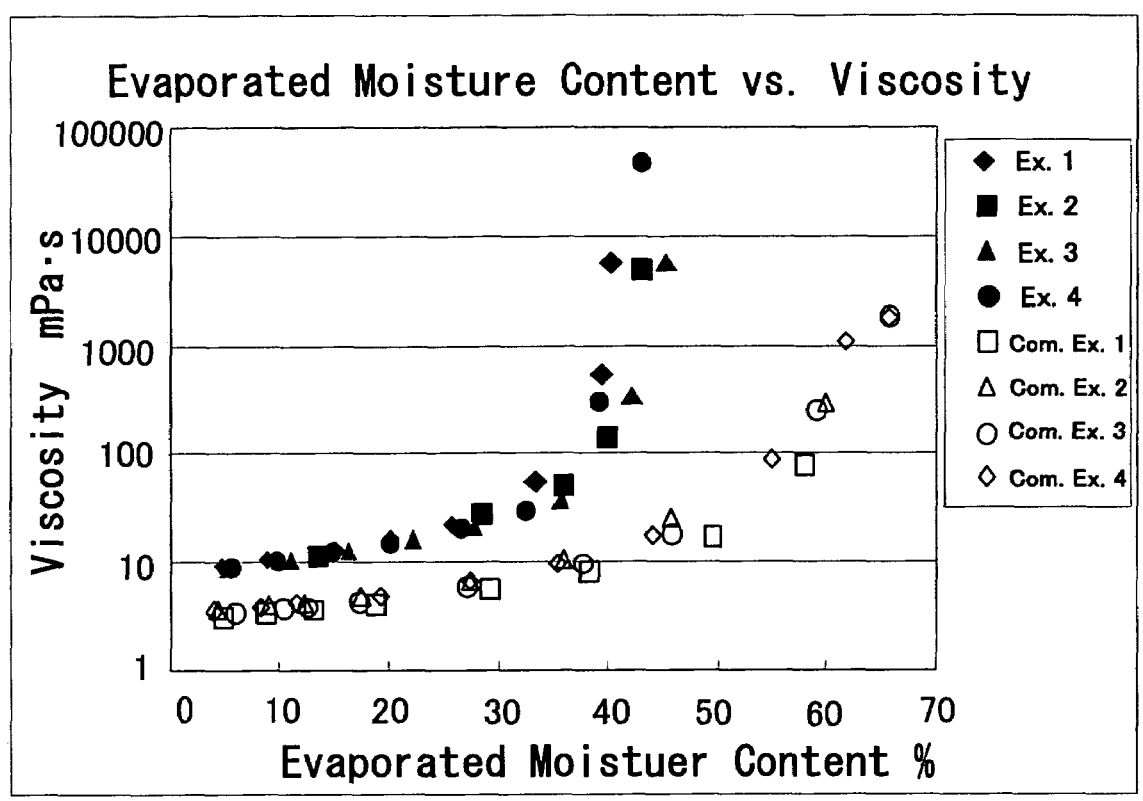
FIG. 1 shows an exemplary relation between the evaporated moisture content and the ink viscosity (at 25° C.).

As for the colorant, pigments are mainly employed on the grounds of durability in general, however, dyes may be combined with pigments in order to adjust the color if necessary within the range that the durability is maintained.

The pigments may be inorganic or organic, and such pigments may be employed as self-dispersing pigments, dispersions dispersed with surfactant and/or polymer dispersant, emulsion type pigments, and self-dispersing pigments coated with resin.

Examples of the inorganic pigment include titanium oxide, iron oxide, calcium carbonate, barium sulfate, aluminum hydroxide, barium yellow, cadmium red, and chrome yellow, and also carbon blacks manufactured by known methods in the art such as contact method, furnace method and thermal method.

Examples of the organic pigment include azo pigments such as azo lakes, insoluble azo pigments, condensed azo pigments, and chelated azo pigments; polycyclic pigments such as phthalocyanine pigments, perylene pigments, perynone pigments, anthraquinone pigments, quinacridone pigments, dioxadine pigments, indigo pigments, thioindigo pigments, isoindolinone pigments, and quinophthalone pigments; dye chelates such as basic dye chelates and acidic dye chelates; nitro pigments, nitroso pigments, aniline black, and the like. Among these pigments, those of high affinity with water are preferred in particular.

Specific examples of the black pigment include carbon black (C.I. Pigment Black 7) such as furnace black, acetylene black and channel black; metal and metal compounds such as copper, iron (C.I. Pigment Black 11), and titanium oxide; and organic pigments such as Aniline Black.

Specific examples of the color pigments include C.I. Pigment Yellow 1, 3, 12, 13, 14, 17, 24, 34, 35, 37, 42 (i.e., yellow iron oxide), 53, 55, 81, 83, 95, 97, 98, 100, 101, 104, 408, 109, 110, 117, 120, 128, 138, 150, 151, 153, and 183; C.I. Pigment Orange 5, 13, 16, 17, 36, 43 and 51; C.I. Pigment Red 1, 2, 3, 5, 17, 22, 23, 31, 38, 48:1, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15, 15:1, 15:2, 15:3 (Phthalocyanine Blue), 16, 17:1, 56, 60 and 63; C.I. Pigment Green 1, 4, 7, 8, 10, 17, 18 and 36; etc.

Preferably, the surface of the pigment is modified such that at least one kind of hydrophilic groups is attached directly to, or with other intervening atomic groups, the surface of the pigment. Specifically, such pigment may be produced through causing chemical bond of certain functional group such as sulfone group or carboxyl group to the surface of pigment, alternatively, through causing oxidization of the pigment with hypohalogen acid and/or its salt in a wet condition. A favorable condition in particular is that the surface of pigment is attached with carboxyl groups and the pigment is dispersible in water. Such surface modified pigment with carboxyl groups may provide dispersion stability and high quality printing, and also may provide higher water resistance of printed recording medium.

Further, such condition of ink may afford re-dispersibility of ink even after drying of ink, therefore, appropriate printing may be carried out without clogging of ink flow by means of a simple cleaning if necessary, even after prolonged stoppage of printing or even when the ink moisture is reduced through evaporation around the site of the nozzle of the ink head. Moreover, such self-dispersible pigment may provide high quality images and high reliability with a synergistic effect typically when combined with a surfactant and wetting agent described later.

In addition to the aforesaid pigments, polymer emulsions may be employed in a configuration that water-insoluble or hardly water-soluble pigments are incorporated in the polymer fine particles. As for the polymer emulsions containing pigments, such configurations may be exemplified as polymer fine particles encapsulating pigments and/or polymer fine particles adsorbing pigments on their surface. In such configurations, the entire pigment is not necessarily required to be encapsulated or adsorbed, but an amount of pigment may be dispersed in the emulsions, in a range that the effect of the present invention is no deteriorated.

Examples of the polymer that constitutes polymer emulsion include vinyl polymers, polyester polymers, and urethane polymers; in particular vinyl polymers and polyester polymers are preferred.

Further, in the present invention, such pigments as dispersed in aqueous medium with the aid of dispersants may be combined. Preferable pigments are known pigments in the art utilized to prepare known pigment dispersions.

Examples of such pigment include polyacrylic acids, polymethacrylic acids, acrylic acid-acrylonitrile copolymers, vinyl acetate-acrylate copolymers, acrylic acid-acrylic acid alkylester copolymers, styrene-acrylic acid copolymers, styrene-methacrylic acid copolymers, styrene-acrylic acid-acrylic acid alkylester copolymers, styrene-methacrylic acid-acrylic acid alkylester copolymers, styrene-α-methylstyrene-acrylic acid copolymers, styrene-α-methylstyrene-acrylic acid-acrylic acid alkylester copolymers, styrene-maleic acid copolymers, vinylnaphthalene-maleic acid copolymers, vinyl acetate-ethylene copolymers, vinyl acetate-fatty acid vinylester-ethylene copolymers, vinylacetate-maleic acid ester copolymers, vinylacetate-crotonic acid copolymers, vinylacetate-acrylic acid copolymers and the like.

The weight-average molecular weight (Mw) of these copolymers is preferably 3,000 to 50,000, more preferably 5,000 to 30,000 and most preferably from 7,000 to 15,000.

The content of the dispersants may be properly selected in a range that the pigment is stably dispersed as well as the effect of the present invention is not reduced. The ratio (P/D) of the pigment (P) to the dispersant (D) is preferably 1/0.06 to 1/3, and more preferably 1/0.125 to 1/3.

As above described, carboxyl groups are preferably attached to the dispersant of the ink, thereby the effects on dispersion stability, printing quality, and water resistance may be provided.

In addition to theses effects, carboxyl groups may provide an additional effect to prevent the bleeding to back surface of paper. In particular, in combination of pigment, dispersed with the aid of dispersant to which carboxyl groups are attached, and wetting agent, such effects as sufficient drying rate and less bleeding to back face may be attained even when the printing is carried out on relatively wide recording medium of plain paper. The reason is considered that the solubility of dispersant itself is rendered to lower and the coagulation of dispersant itself and the pigment are induced, due to the decrease of ink pH and interaction with multivalent metal ion such as calcium ion that exists near the recording medium surface, following the adhesion of pigment to the recording medium, since the dissociation constant of carboxyl group is relatively low compared to the other acidic groups.

In the present invention, in addition to the pigments, the following dyes may be employed.

Specific examples of acid dye and food dye include C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2.

Specific examples of the direct dye include C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

Specific examples of the basic dye include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

Specific examples of the reactive dye include C.I. Reactive Black 3, 4, 7, 11, 12 and 17; Reactive Yellow 1, 5, 11, 13, 14, 20, 21, 22, 25, 40, 47, 51, 55, 65 and 67; C.I. Reactive red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

Among these dyes, acid dyes and direct dyes are particularly preferred.

The content of these colorants in the ink is preferably 3 to 15% by weight, more preferably 5 to 12% by weight.

As for humectants, preferable for the present invention are those tend to form hydrogen bond, represent solely higher viscosity, exhibit higher equivalent moisture, and exhibit lower viscosity in the presence of water.

Examples of such humectant selected from multivalent alcohols include glycerin, ethylene glycol, diethylene glycol, triethylene glycol, propylene glycol, dipropylene glycol, tripropylene glycol, 3-methyl-1,3-butanediol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol and the like. Glycerin provides rapid increase of viscosity with moisture evaporation, on the other hand suppresses the coagulation of colorant thereby provides a superior effect on preventing the growth of particle size. Accordingly, glycerin is preferably included in a content of 20% or more by weight based on the whole humectant. Further, glycerin is preferable with respect to the higher equivalent moisture content.

Preferably, the humectant comprises two or more kinds of multivalent alcohols that respectively exhibit 25% or more by weight of equivalent moisture in a condition of 20° C. temperature and 60% relative humidity.

Further, in a preferable aspect, one of the multivalent alcohols is glycerin and the content of glycerin is 20% by weight to 80% by weight based on the whole humectant.

As for the humectants combined with glycerin, 1,3-butanediol and 3-methyl-1,3-butanediol are preferable. These 1,3-butanediol and 3-methyl-1,3-butanediol may provide higher equivalent moisture contents similarly to glycerin and higher reliability, and also may afford such an effect as uniform spreading of applied ink drops of image elements on paper and also an effect as reserving sufficiently the ink material on paper surface. The 3-methyl-1,3-butanediol in particular may provide the effect to spread uniformly the ink drops thereby high quality images may be formed.

Glycerin may provide a superior effect on enhancing reliability, whereas may deteriorate the image quality, may provide excessively high viscosity following moisture evaporation, and may deteriorate discharging stability when a plenty amount of glycerin is compounded. The blending ratio of these butanediol and glycerin is preferably 1:4 to 4:1, more preferably 1:3 to 3:1, most preferably 1:1 to 3:1.

As for the content of humectant based on the whole ink, the effects of the present invention may be derived in the range of 10 to 40% by weight, most preferably the content of humectant is 25 to 35% by weight. When the content of humectant is excessively low, the storage stability and discharging stability may be insufficient, and the nozzle is likely to be clogged. On the other hand, when the content of humectant is excessively high, the ink is likely hard to be dried, and the bleeding of letters and the bleeding at the color boundaries tend to occur, resulting in lower image quality.

The surfactant and wetting agent are incorporated into the ink according to the present invention, in order to provide the desired properties described later respectively. The surfactant employed in the present invention is one that may reduce the static surface tension at around 1000 milliseconds (hereinafter referring to "msec") in particular, thereby facilitating the ink to infiltrate into paper when the ink drops are applied on the paper. On the other hand, the wetting agent employed in the present invention is one that may reduce the relatively dynamic surface tension at around 10 to 100 msec in particular, thereby facilitating the ink to spread on the surface of paper at the moment when the ink drops are applied on the paper.

The combination of these surfactant and wetting agent may provide an ink wherein the image elements spread on paper more appropriately with higher infiltration velocity into paper, i.e. quick-drying property, resulting in images of higher quality with higher production rate.

The surfactant may be properly selected from ampholytic surfactants, nonionic surfactants, and anionic surfactants. Preferably, nonionic surfactants such as polyoxyethylene alkylphenylether, polyoxyethylene alkylester, polyoxyethylene alkylamine, polyoxyethylene alkylamide, polyoxyethylene blockpolymer, sorbitanfattyacidester, polyoxyethylene sorbitanfattyacidester, acetylenealcohol of ethyleneoxide additive are employed considering the relation between the dispersion stability of materials and image quality.

Further, fluoride containing surfactants or silicone surfactants may be allowable in alone or in combination depending on the recipe.

Among these, the nonionic surfactants expressed by the following formula (1) is preferable in particular.

$$R\!\!-\!\!O\!\!-\!\!(C_2H_4O)_m\!\!-\!\!H \qquad \text{formula (1)}$$

wherein, "R" represents a linear or blanched alkyl group with 6 to 14 carbon atoms, "m" represents a positive integer.

Considering the image quality, "R" is preferably an alkyl group with 10 or more carbon atoms; "m" is preferably 7 to 9.

The content of the surfactants in the ink composition is preferably 0.01 to 5.0% by weight, more preferably 0.5 to 3.0% by weight. When the content is less than 0.01% by weight, the effects are not significant, and when more than 5.0% by weight, the infiltration into the recording media is excessively remarkable, and the degrade of images and/or the bleeding to back face may be induced.

The specific examples of the compounds expressed by the above noted formula (1) include, but not limited to:

TABLE 1

| | | | |
|---|---|---|---|
| $C_8H_{17}O(C_2H_4O)_2H$ | (1-1) | $C_{10}H_{21}O(C_2H_4O)_4H$ | (1-2) |
| $C_{12}H_{25}O(C_2H_4O)_3H$ | (1-3) | $C_{12}H_{25}O(C_2H_4O)_7H$ | (1-4) |
| $C_{12}H_{25}O(C_2H_4O)_{12}H$ | (1-5) | $C_{13}H_{27}O(C_2H_4O)_3H$ | (1-6) |
| $C_{13}H_{27}O(C_2H_4O)_5H$ | (1-7) | $C_{13}H_{27}O(C_2H_4O)_7H$ | (1-8) |
| $C_{13}H_{27}O(C_2H_4O)_9H$ | (1-9) | $C_{13}H_{27}O(C_2H_4O)_{12}H$ | (1-10) |
| $C_{13}H_{27}O(C_2H_4O)_{20}H$ | (1-11) | $C_{13}H_{27}O(C_2H_4O)_{30}H$ | (1-12) |
| $C_{13}H_{29}O(C_2H_4O)_{30}H$ | (1-13) | | |

These surfactants may be used alone or in combination. Even when a surfactant does not easily dissolve into a recording liquid, the surfactant may dissolve and realize a long life through being combined with the other surfactants in some instances. As for the commercial surfactants that include the above noted compounds as their main components, BT series from Nikko Chemicals Co., Softanol series from Nippon Shokubai Co., and Dispernol from Nippon Yushi Co. may be exemplified.

The wetting agent employed in the present invention preferably contains at least one of polyol having a solubility of 0.2% by weight or more and less than 5.0% by weight against water at 20° C.

Examples of fatty diol among such polyols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol and the like.

Among these, 2-ethyl-1,3-hexanediol and/or 2,2,4-trimethyl-1,3-pentanediol are most preferable.

Examples of the other wetting agent possible to be combined include alkyl and aryl ethers of multivalent alcohols such as diethyleneglycol monophenylether, ethyleneglycol monophenylether, ethyleneglycol monoallylether, diethyleneglycol monobutylether, propyleneglycol monobutylether, and tetraethyleneglycol chlorophenylether; and lower alcohols such as ethanol. The wetting agents are not limited to these compounds, provided that they may dissolve into the ink and adjust the desired properties.

The content of the wetting agent is preferably 0.1 to 4.0% by weight. When the content is less than 0.1% by weight, rapid drying property is not achieved, resulting in spread images. On the other hand, when the content is more than 4.0% by weight, such matters are encountered that the dispersion stability of the colorant is insufficient, the nozzle tends to be clogged, the infiltration into the recording medium exceeds the necessary level, and also decrease of image density and bleeding to back surface tend to occur.

The pH controlling agent may any substance, provided that pH of recording liquid is adjustable to a desired range without causing an adverse effect on the prepared recording liquid.

Examples of the pH controlling agent include amines such as diethanol amine, triethanol amine and the like; hydroxides of alkali metal element such as lithium hydroxide, sodium hydroxide, potassium hydroxide and the like; ammonium hydroxide, hydroxides of quaternary ammonium, hydroxides of quaternary phosphonium, lithium carbonate, sodium carbonate, potassium carbonate and other carbonates of alkali metals.

When a suitable amount of polyvalent alcohol containing amino group is utilized as a pigment-coagulation inhibitor, the dispersion stability of the pigment may be improved more remarkably owing to inhibiting the coagulation of the pigment, and the reliability of discharging stability may be assured. The content thereof depends on the recipe and the desired pH value; in general 0.01 to 2.0% by weight is preferable, and 0.1 to 1.0% by weight is more preferable. Also, 2-amino-2-ethyl-1,3-propanediol is preferable for the pigment-coagulation inhibitor in carrying out the present invention in particular, and the addition of 2-amino-2-ethyl-1,3-propanediol may enhance the possibility of the member utilized in an ink flow passage to contact with the recording liquid.

As for the other additive ingredients, water-soluble organic solvents such as 2-pyrrolidone, N-methyl-2-pyrrolidone, $\epsilon$-caprolactam, monoethanol amine and diethanol amine may be successfully incorporated into the inventive ink to prevent the ink from premature drying.

As for another additive ingredient, antiseptic-antifungal agents such as sodium dehydroacetate, sodium sorbate, sodium 2-pyridinethiol-1-oxide, sodium benzoate and sodium pentachlorophenol may be incorporated into the inventive ink.

As for chelating agents for still another additive agent, sodium ethylenediaminetetraacetate, sodium nitrilotriacetate, sodium hydroxyethyl ethylenediaminetriacetate, sodium diethylenetriaminepentaacetate and sodium uramil diacetate may be exemplified.

As for rust-inhibitors for still another additive agent, acidic sulfites, sodium thiosulfate, ammonium thiodiglycolate, diisopropylammonium nitrite, pentaerythritol tetranitrate, dicyclohexylammonium nitrite and benzotriazole and the like may be exemplified.

The ink according to the present invention may form images with higher quality in consistent, by discharging the ink toward printable area or non-printing area before the evaporated moisture content exceeds 30% by weight around the site of the nozzle. Further, the recording conditions that the volume of ink drops discharged from the nozzle is 3 to 40 pico-liter (hereinafter referring to "pl"), the velocity of the discharged ink drops is 6 to 20 m/sec (meter/second), the frequency is 1 kHz or more, and the resolution is 300 dots per inch (hereinafter referring to "dpi") or more make full use of the features of the inventive ink.

Since the inventive ink thickens rapidly when the evaporated moisture content exceeds 30% by weight base on the whole ink weight, the inventive ink should be utilized in a process and/or apparatus that comprise a sequence to discharge the ink on printable area or non-printing area prior to the evaporated moisture content exceeds 30% by weight. As for one way to discharge the ink to non-printing area, the scanning number of head-installed carriage is countered, the head is driven such that the ink is discharged to non-printing area when the scanning number exceeds a predetermined value, thereby a certain amount of ink may be discharged. Preferably, the amount of ink discharged to non-printing area is set so as to charge minimum amount of ink within the range that the reliability is maintained and without decreasing the printing velocity, wherein the amount of ink discharged to the non-printing area may be optionally set by altering the driving times of the head.

As for the way to receive the discharged ink, for example, an ink receiver may be disposed outside the belt for conveying the recorded medium, considering the configuration of the recording apparatus. Thus, by employing the way to discharge the ink into the ink receiver disposed in the non-printing area when the scanning number exceeds a predetermined number, a recording apparatus may be provided that assures more stable discharging performance.

Further, owing to providing a recording apparatus that equips a recording head composed of plural pressuring liquid rooms, nozzles with no more than 35 μm aperture that communicates to the pressuring liquid rooms, ink supplying passage(s), vibrating plate(s), and electromechanical transforming unit to displace the vibrating plate, and also providing a feature to merge a plurality of continuously discharged ink drops into a larger drop prior to reaching to the recording medium, the discharging stability of ink may be assured, even if the ink has higher viscosity.

The present invention will be illustrated in more detailed with reference to examples given below, but these are not to be construed as limiting the present invention. All percentages and parts are by weight unless indicated otherwise.

EXAMPLES

Example 1

Regarding Ink

| Black Ink | |
|---|---|
| KM-9036 (Toyo Ink Co., self-dispersible pigment) | 50% |
| Glycerin (humectant) | 10% |
| 1,3-butanediol (humectant) | 15% |
| 2-ethyl-1,3-hexanediol (wetting agent) | 2% |
| 2-pyrrolidone | 2% |
| Surfactant (1-9) | 1% |
| Silicone Antifoamer KS508 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 1 was prepared.

Example 2

Regarding Ink

Preparation of Polymer Solution A

After the inside atmosphere of one-liter flask equipped with a stirrer, thermometer, inlet tube for nitrogen gas, reflux condenser, and dropping funnel was sufficiently backfilled with nitrogen gas, 11.2 g of styrene, 2.8 g of acrylic acid, 12.0 g of lauryl methacrylate, 4.0 g of polyethyleneglycol methacrylate, 4.0 g of styrene macromer, and 0.4 g of mercapto ethanol were blended and heated to 65° C.

Then, a mixed solution consisting of 100.8 g of styrene, 25.2 g of acrylic acid, 108.0 g of lauryl methacrylate, 36.0 g of polyethyleneglycol methacrylate, 60.0 g of hydroxyethylmethacrylate, 36.0 g of styrene macromer, 3.6 g of mercapto ethanol, 2.4 g of azobismethyl valeronitrile, and 18 g of methylethylketone was fed into the flask in droplets for two and half hours. After the dropping of the solution was completed, a mixed solution consisting of 0.8 g of azobismethyl valeronitrile and 18 g of methylethylketone was fed into the flask in droplets for half hour. Following to maintain at 65° C. for one hour to allow reactions, 0.8 g of azobismethyl valeronitrile was added to the flask, and further allowed the reaction for one hour. After the reactions were completed, 364 g of methylethylketone was poured into the flask, then 800 g of polymer solution at 50% concentration was recovered.

Preparation of Aqueous Dispersion of Pigment Containing Polymer Fine Particles

Initially, 28.0 g of polymer solution A, 26.0 g of C.I. pigment yellow 97, 13.6 g of potassium hydroxide aqueous solution of 1 mol/L, 20 g of methylethylketone, and 13.6 g of de-ionized water were sufficiently stirred, then were kneaded by means of a roll mill. The resulting paste was poured into de-ionized water of 200 g, then was served to sufficient stirring, followed by evaporation of methylethylketone and water by means of a evaporator, to prepare an aqueous dispersion of yellow polymer particles.

| Yellow Ink | |
|---|---|
| Dispersion of Yellow Polymer Fine Particles | 40% |
| Glycerin (humectant) | 8% |
| 1,3-butanediol (humectant) | 20% |
| 2,2,4-tri methyl-1,3-pentanediol (wetting agent) | 2% |
| Surfactant (1-8) | 1.5% |
| Silicone Antifoamer KS508 (Shin-Etsu Che.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 2 was prepared.

Example 3

Regarding Ink

Preparation of Aqueous Dispersion of Pigment Containing Polymer Fine Particles

An aqueous dispersion of magenta polymer fine particles was prepared according to the same manner with Example 2, except that the pigment was replaced to C.I. pigment red 122.

| Magenta Ink | |
|---|---|
| Dispersion of magenta polymer fine particles | 50% |
| Glycerin (humectant) | 10% |

| -continued | |
|---|---|
| Magenta Ink | |
| 1,3-butanediol (humectant) | 18% |
| 2,2,4-tri methyl-1,3-pentanediol (wetting agent) | 2% |
| Surfactant (1-8) | 1.5% |
| Silicone Antifoamer KS508 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 3 was prepared.

Example 4

Regarding Ink

Preparation of Aqueous Dispersion of Pigment Containing Polymer Fine Particles

An aqueous dispersion of cyan polymer fine particles was prepared according to the same manner with Example 2, except that the pigment was replaced to C.I. pigment blue 15:3.

| Cyan Ink | |
|---|---|
| Dispersion of cyan polymer fine particles | 40% |
| Glycerin (humectant) | 10% |
| 1,3-butanediol (humectant) | 20% |
| 2,2,4-tri methyl-1,3-pentanediol (wetting agent) | 2% |
| Surfactant (1-8) | 1.5% |
| Silicone Antifoamer KS508 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 4 was prepared.

Comparative Example 1

Regarding Ink

An amount of ink was withdrawn from a yellow ink cartridge commercially sold by A company, and was evaluated as an ink of Comparative Example 1.

Comparative Example 2

Regarding Ink

An amount of ink was withdrawn from a magenta ink cartridge commercially sold by A company, and was evaluated as an ink of Comparative Example 2.

Comparative Example 3

Regarding Ink

An amount of ink was withdrawn from a cyan ink cartridge commercially sold by A company, and was evaluated as an ink of Comparative Example 3.

Comparative Example 4

Regarding Ink

An amount of ink was withdrawn from a black ink cartridge commercially sold by A company, and was evaluated as an ink of Comparative Example 4.

As for the inks of Examples 1 to 4 and Comparative Examples 1 to 4, the following evaluation (1) was conducted.

Evaluation (1)—Determination of Rate of Viscosity Increase and Particle Size Change Accompanied with Moisture Evaporation The respective inks of Examples 1 to 4 and Comparative Examples 1 to 4 were allowed to stay in certain amount respectively at the condition of 50° C. temperature and 10% humidity; then the changes of ink weight were determined, and also the viscosity (25° C.) and the particle size were determined after allowing to stay in the same condition for certain period. The viscosity was determined by means of Viscometer RL-500 (Toki Sangyo Co.,), and the particle size was determined by means of Particle Size Analyzer UPA 150 (Micro Track Co.,) in 500-fold dilution.

The evaporated moisture content (%) in accordance with the present invention is such measurement obtained after allowing to stay in 50° C. temperature and 10% humidity and then determining the amount of the evaporated moisture.

Figure 2:
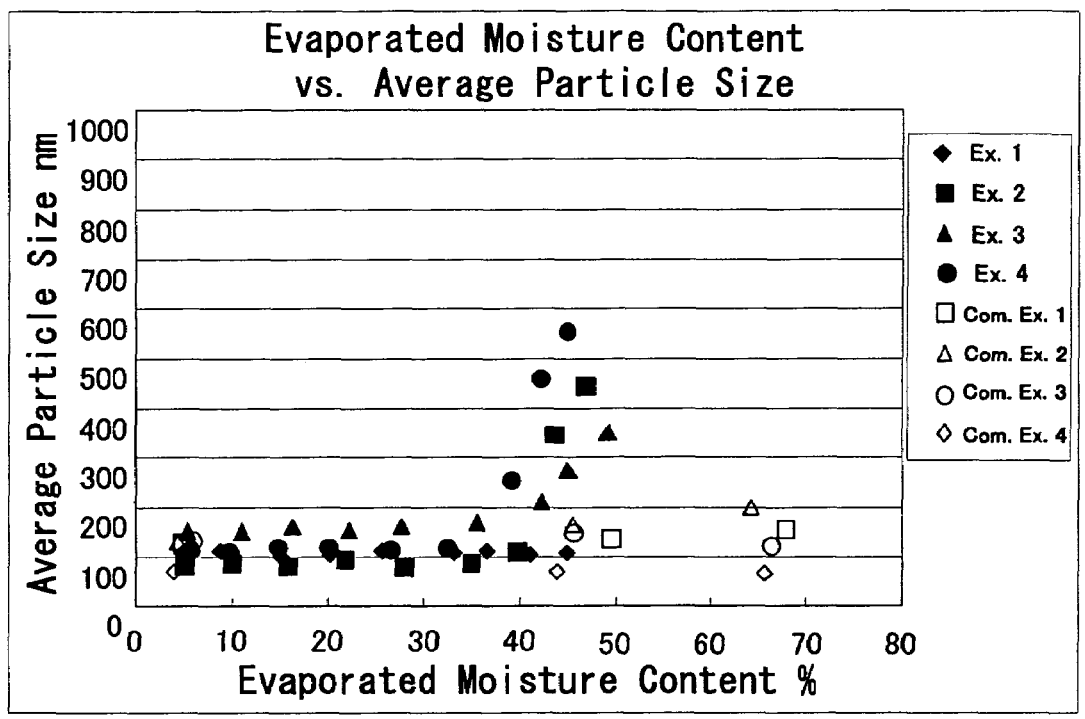
FIG. 2 shows an exemplary relation between the evaporated moisture content and the average particle size of ink.

The relation between the evaporated moisture content (%) and the viscosity of ink (25° C.) is shown in FIG. 1; the relation between the evaporated moisture content (%) and the average particle size of ink is shown in FIG. 2. In FIGS. 1 and 2, the solid marks represent Examples, the hallow marks represent Comparative Examples, the rhombus marks correspond to the black ink, the square marks correspond to the yellow ink, the triangle marks correspond to the magenta ink, and the circle marks corresponds to cyan ink.

As shown in FIGS. 1 and 2, the viscosities of the inventive inks increase rapidly when the evaporated moisture content is 30 to 45% based on the total weight of ink; whereas the viscosities of the comparative inks increase when the evaporated moisture content is 50% or more.

The average particle sizes of the inventive inks, at the stage of increased viscosity, remain no more than five times that of the initial average particle sizes, which is similar to the behavior of the comparative inks.

The following evaluation (2) was conducted with respects to one set of inks of Examples 1 to 4 (referring to "ink set of Example 1"), and another set of inks of Comparative Examples 1 to 4 (referring to "ink set of Comparative Example 1").

Evaluation (2): Evaluation of Printing Quality

Color images were printed in a mode of constant printing rate, in which the inventive inks were processed by means of a recording apparatus explained afterward, whereas the comparative inks were processes by means of a printer adapted to commercial product A. The printed images were visually evaluated with respect to the letter bleeding and color boundary bleeding. The paper for the evaluation was plain paper.

The results of the evaluation were expressed with rating as follow:

Rating A: No bleeding
Rating B: Little bleeding
Rating C: Some bleeding
Rating D: Definite bleeding

TABLE 2

| Ink Set | Evaluation (2) | |
|---|---|---|
| | Letter Bleeding | Color Boundary Bleeding |
| Example 1 | A | A |
| Comparative Example 1 | C | B |

The inks of ink set of Example 1 exhibited higher viscosity prior to or at the same time with the ink drops being applied to the paper, owing to moisture evaporation, than the inks of ink set of Comparative Example 1, therefore, provided clearer images without letter bleeding in particular.

Comparative Example 5

Regarding Ink Set

The ink set of Comparative Example 5 was prepared in the same manner with the ink set of Example 1, except that the surfactant and wetting agent of Example 1 were not compounded.

Comparative Example 6

Regarding Ink Set

The ink set of Comparative Example 6 was prepared in the same manner with the ink set of Example 1, except that the wetting agent of Example 1 was not compounded.

Comparative Example 7

Regarding Ink Set

The ink set of Comparative Example 7 was prepared in the same manner with the ink set of Example 1, except that the surfactant of Example 1 was not compounded.

Figure 3:
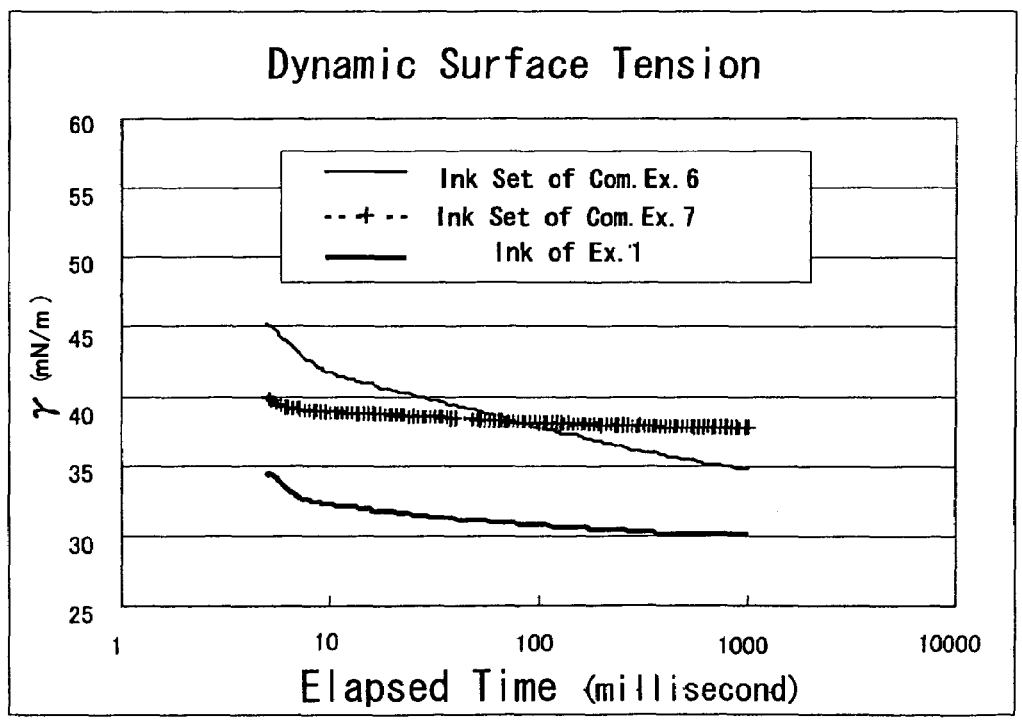
FIG. 3 shows exemplary decreases of dynamic surface tension.

The black inks of the ink sets of Comparative Examples 6 and 7 and Example 1 were compared as to their dynamic surface tension, and the result was obtained as shown in FIG. 3. The dynamic surface tension was determined at 25° C. by means of Dynamic Surface Tension Measuring Instrument BP-2 (KRUSS Co.). It is demonstrated that the dynamic surface tension did not decrease during 10 to 100 milliseconds in the ink without the wetting agent, and also that the static surface tension did not decrease at around 1000 milliseconds in the ink without the active agent.

As to the results of the evaluation (1) with respect to the ink sets of Comparative Examples 5 to 7, the respective inks of the ink set of Comparative Example 5 showed a rapid viscosity increase at the evaporated moisture content of 50% or more. The respective inks of the ink sets of Comparative Examples 6 and 7 showed a rapid viscosity increase at the evaporated moisture content of 38 to 42%. Further, the results of evaluation (2) were as follows.

TABLE 3

| Ink Set | Evaluation (2) | |
|---|---|---|
| | Letter Bleeding | Color Boundary Bleeding |
| Comparative Example 5 | D | D |
| Comparative Example 6 | C | C |
| Comparative Example 7 | C | C |

The results demonstrate that the inks without the surfactant and wetting agent exhibit significant letter bleeding and color boundary bleeding.

Reference Example 1

Regarding Ink

The ink of Reference Example 1 was prepared in the same manner with the ink of Example 4, except that the amount of glycerin was changed to 5% by weight, and the amount of 1,3-butanediol was changed to 23% by weight.

Reference Example 2

Regarding Ink

The ink of Reference Example 2 was prepared in the same manner with the ink of Example 4, except that the amount of glycerin was changed to 23% by weight, and the amount of 1,3-butanediol was changed to 5% by weight.

As to the results of the evaluation (1) with respect to the inks of Example 4 and Reference Examples 1 to 2, the ink of Reference Example 1 showed a viscosity increase at the evaporated moisture content of 35 to 38% by weight based on the total ink weight, whereas the ink of Reference Example 2 showed a viscosity increase at the evaporated moisture content of 43 to 45% by weight. Further, the average particle size of the ink of Reference Example 1 changed to 4.8 times that of initial state, whereas the ink of Reference Example 2 showed little change in the size. The evaluation (2) concerning to letter bleeding with respect to these inks showed the following results.

TABLE 4

| Evaluation (2) | |
| --- | --- |
| Ink | Letter Bleeding |
| Example 4 | A |
| Comparative Example 1 | A |
| Comparative Example 2 | B |

Example 5

Regarding Ink

The ink of Example 5 was prepared in the same manner with the ink of Example 2, except that 0.5% by weight of 2-amino-2-ethyl-1,3-propanediol was included additionally into the ink composition.

Example 6

Regarding Ink

The ink of Example 6 was prepared in the same manner with the ink of Example 4, except that 0.5% by weight of 2-amino-2-ethyl-1,3-propanediol was included additionally into the ink composition.

Figure 4:
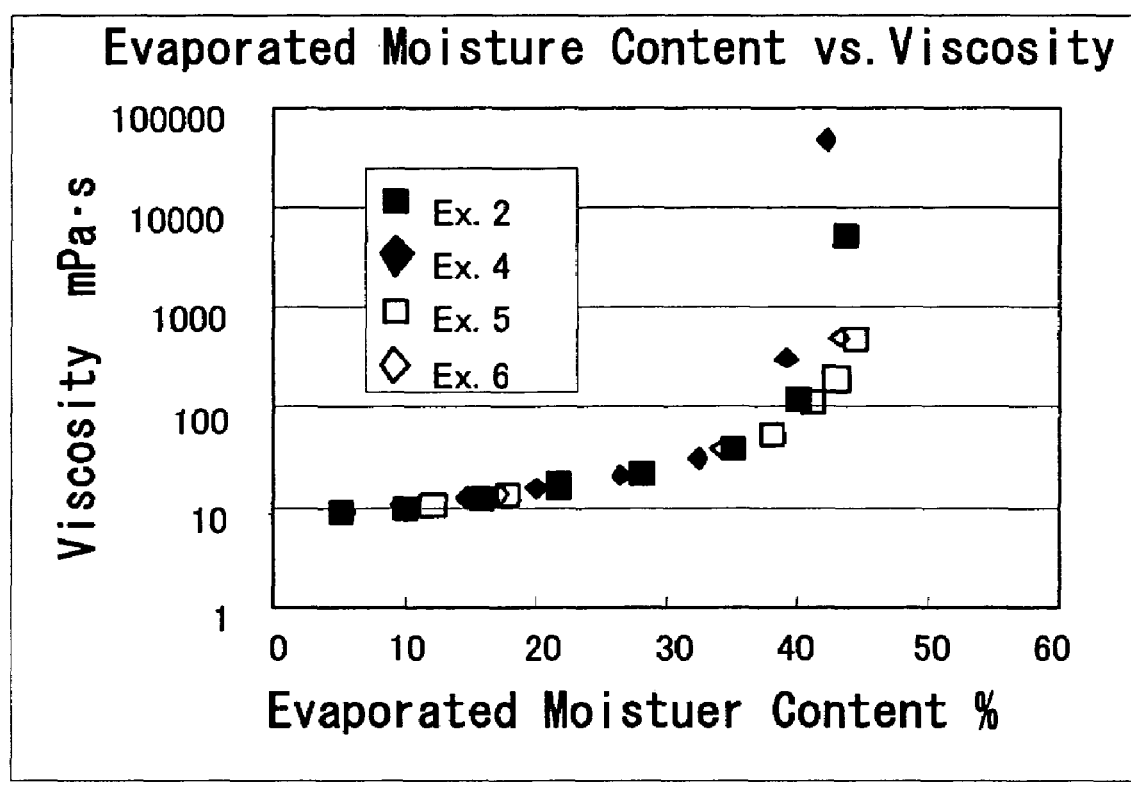
FIG. 4 shows another exemplary relation between the evaporated moisture content and the ink viscosity.
Figure 5:
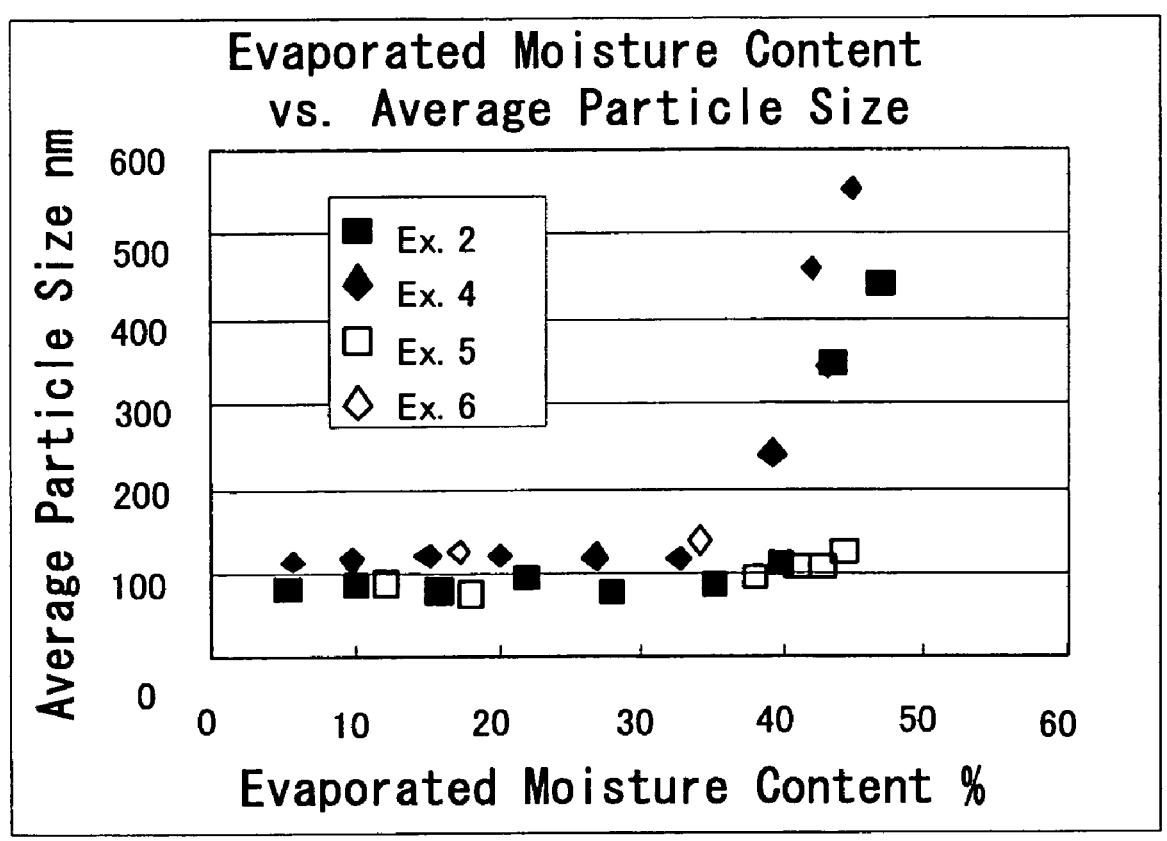
FIG. 5 shows another exemplary relation between the evaporated moisture content and the average particle size of ink.

As to the results of the evaluation (1) with respect to the inks of Example 5 and 6, the respective inks of Examples 5 and 6 showed less change in particle size during moisture evaporation compared to the inks without 2-amino-2-ethyl-1,3-propanediol (see FIGS. 4 and 5). Further, the evaluation (2) concerning to the letter bleeding showed that the inks of Examples 5 and 6 were similar to the inks without 2-amino-2-ethyl-1,3-propanediol.

The following evaluation (3) was conducted on the inks of Examples 2, 4, 5 and 6, and Reference Examples 1, 2.

Evaluation (3): Intermittent Printing Examination

Employing IJ Printer IPSiO Jet 300 (nozzle size 31 μm, by Ricoh Co., Ltd.) for the evaluating instrument, such an operation was repeated ten times as scanning a carriage for 30 seconds without discharging (free scanning) for a predetermined period, printing 20 drops per respective nozzles on gloss film for ink jet, then conducting a recovering motion (50 drops for purging).

The evaluation was conducted by judging visually an enlarged photography, wherein the photography was taken during printing of 20 drops, especially with respect to the dot of the first drop in the jet direction. The judging reference was as follows.

Rating A: No turbulence exists in the jet direction. Dots are normal in size and aligned.

Rating B: No turbulence exists in the jet direction. Dots are almost aligned but somewhat little in size.

Rating C: Some turbulence exists in the jet direction, but the turbulence does not extend to the second line.

Rating D: The first dot extends beyond the second dot line.

Rating E: No drop was discharged.

TABLE 5

| Evaluation (3) | |
| --- | --- |
| Ink | Intermittent Printing Examination |
| Example 2 | B |
| Example 4 | B |
| Reference Example 1 | C |
| Reference Example 2 | B |
| Example 5 | A |
| Example 6 | A |

The results show that when the glycerin amount is less than 20% by weight in the humectant, the reliability tends to be insufficient, on the other hand when the glycerin amount is more than 80% by weight, the occurrence of letter bleeding appears. Further, the addition of 2-amino-2-ethyl-1,3-propanediol enhances the reliability of discharging.

Example 7

Regarding Ink

Initially, pigment dispersion was prepared in the following procedure.

| Yellow Pigment Dispersion | |
| --- | --- |
| C.I. Pigment Yellow | 20% |
| Polyoxyethyleneoleylether ammoniumsulfate | 15% |
| Ethylene glycol | 30% |
| Pure water | balance |

The above-noted ingredients were subjected to dispersing by means of a sand mill after blending, then were treated with centrifugation procedure in order to remove relatively coarse particles, thereby a yellow pigment dispersion was prepared.

| Yellow Ink | |
|---|---|
| Yellow Pigment Dispersion | 20% |
| Glycerin | 5% |
| Diethylene glycol | 15% |
| 2-ethyl-1,3-hexanediol | 2% |
| Surfactant (1–7) | 2% |
| Silicone Antifoamer KS531 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of example 7 was prepared.

Example 8

Regarding Ink

Initially, a pigment dispersion was prepared in the following procedure.

| Magenta Pigment Dispersion | |
|---|---|
| C.I. Pigment Red 122 | 30% |
| Polyoxyethyleneoleylether ammoniumsulfate | 15% |
| Ethylene glycol | 30% |
| Pure water | balance |

The above-noted ingredients were subjected to dispersion by means of a triple roll mill, after the blending procedure, then were treated with centrifugation procedure in order to remove relatively coarse particles, thereby a magenta pigment dispersion was prepared.

| Magenta Ink | |
|---|---|
| Magenta Pigment Dispersion | 25% |
| Glycerin | 5% |
| Diethylene glycol | 15% |
| 2-ethyl-1,3-hexanediol | 2% |
| Surfactant (1–7) | 1% |
| Silicone Antifoamer KS531 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 8 was prepared.

Example 9

Regarding Ink

Initially, a pigment dispersion was prepared in the following procedure.

| Cyan Pigment Dispersion | |
|---|---|
| C.I. Pigment Blue 15:3 | 30% |
| Polyoxyethyleneoleylether ammoniumsulfate | 15% |
| Ethylene glycol | 30% |
| Pure water | balance |

The above-noted ingredients were subjected to dispersing by means of a wetted sand mill, after blending, then were treated with centrifugation procedure in order to remove relatively coarse particles, thereby a cyan pigment dispersion was prepared.

| Cyan Ink | |
|---|---|
| Cyan Pigment Dispersion | 15% |
| Glycerin | 5% |
| Diethylene glycol | 15% |
| 2-ethyl-1,3-hexanediol | 2% |
| Surfactant (1–7) | 1% |
| Silicone Antifoamer KS531 (Shin-Etsu Chemical Co.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 9 was prepared.

Example 10

Regarding Ink

Initially, a pigment dispersion was prepared in the following procedure.

Self-Dispersible Cyan Pigment Dispersion 20 parts of C.I. Pigment Blue 15:3 and 70 parts of sulfolane were blended to form a compound, and the compound was heated to 120° C. in an oil bath, then 10 parts of sulfamic acid was added to allow sulfonation for 5 hours. After cooling, the resulting reaction product were treated with centrifugation procedure in order to remove relatively coarse particles, thereby a self-dispersible cyan pigment dispersion was prepared.

| Cyan Ink | |
|---|---|
| Self-Dispersible Cyan Pigment Dispersion | 50% |
| Glycerin | 5% |
| Diethylene glycol | 15% |
| 2,2,4-trimethyl-1,3-pentanediol | 2% |
| Surfactant (1–7) | 1% |
| Silicone Antifoamer KS531 (Shin-Etsu Chemical.) | 0.1% |
| De-ionized water | balance |

The ink ingredients of above-noted recipe were blended sufficiently at the room temperature to produce an ink composition, then the resulting ink composition was subjected to filtering through a membrane filter having an average pore size of 1.2 μm, thereby an ink of Example 10 was prepared.

As to the results of the evaluation (1) with respect to the inks of Examples 7 and 8, the increase of viscosity at the evaporated moisture content of 30 to 45% was appeared on both of the inks, and the respective average particle sizes at the range were less than 5 times the size of respective initial states.

Example 2

Regarding Ink Set

The inks of Examples 1, and 7 to 9 were evaluated as the ink set of Example 2.

Example 3

Regarding Ink Set

The inks of Examples 1, 7, 8 and 10 were evaluated as the ink set of Example 3.

As to the evaluation (2) with respect to the ink sets of Examples 2 and 3, the results were as follows:

TABLE 6

| Ink Set | Evaluation (2) | |
| --- | --- | --- |
| | Letter Bleeding | Color Boundary Bleeding |
| Example 2 | A | A |
| Example 3 | A | A |

As to the evaluation (3) with respect to the inks of Examples 7 to 10, the results were as follows:

TABLE 7

| Ink | Evaluation (3) |
| --- | --- |
| | Intermittent Printing Examination |
| Example 7 | B |
| Example 8 | B |
| Example 9 | B |
| Example 10 | B |

Example 11

Regarding Ink

The ink of Example 11 was prepared in the same manner with the ink of Example 1, except that 1,3-butanediol was replaced to 3-methyl-1,3-butanediol.

Example 12

Regarding Ink

The ink of Example 12 was prepared in the same manner with the ink of Example 2, except that an aqueous dispersion of polymer fine particles containing C.I. pigment yellow 97 was replaced to that containing C.I. pigment yellow 74, and 1,3-butanediol was replaced to 3-methyl-1,3-butanediol.

Example 13

Regarding Ink

The ink of Example 13 was prepared in the same manner with the ink of Example 3, except that 1,3-butanediol was replaced to 3-methyl-1,3-butanediol.

Example 14

Regarding Ink

The ink of Example 14 was prepared in the same manner with the ink of Example 4, except that 1,3-butanediol was replaced to 3-methyl-1,3-butanediol.

As to the results of the evaluation (1) with respect to the inks of Examples 11 to 14, the viscosity increase at the evaporated moisture content of 30 to 45% was appeared on the respective inks, and the respective average particle sizes at the range were less than 5 times the size of respective initial states.

Example 4

Regarding Ink Set

The inks of Examples 11 to 14 were evaluated as the ink set of Example 4.

As to the evaluation (2) with respect to the ink set of Example 4, the results were as follows:

TABLE 8

| Ink Set | Evaluation (2) | |
| --- | --- | --- |
| | Letter Bleeding | Color Boundary Bleeding |
| Example 4 | A | A |

As to the evaluation (3) with respect to the inks of Examples 11 to 14, the results were as follows:

TABLE 9

| Ink | Evaluation (3) |
| --- | --- |
| | Intermittent Printing Examination |
| Example 11 | A |
| Example 12 | A |
| Example 13 | A |
| Example 14 | A |

(Ink Cartridge)

The ink cartridge according to the present invention may be provided by charging the aforesaid recording ink according to the present invention into a container, and may comprise the other members properly selected depending on the requirements.

The shape, configuration, size, material and the like of the container may be properly selected depending on the application; for example, the container may be comprised of an ink bag formed of aluminum laminated film, resin film and the like.

Figure 6:
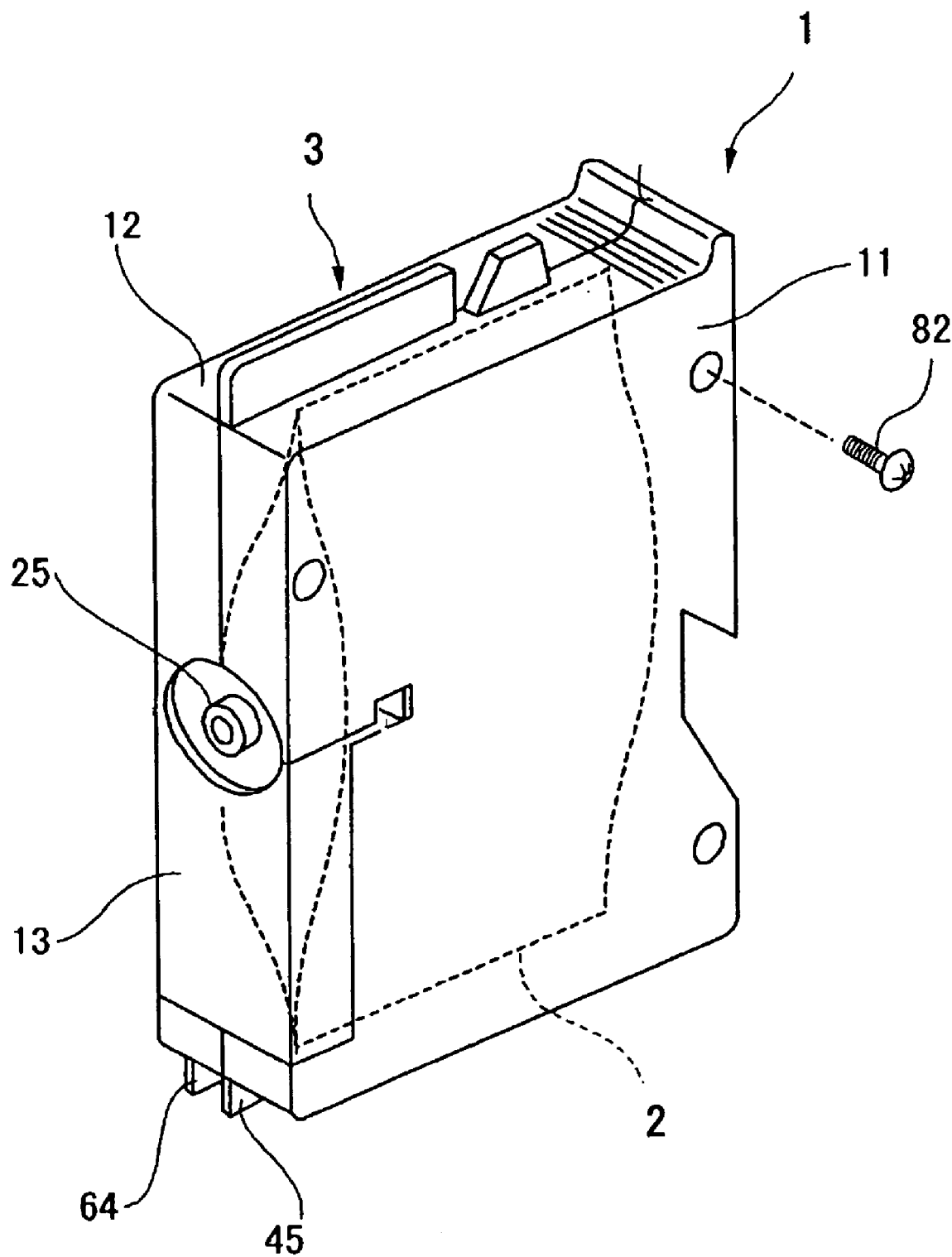
FIG. 6 schematically shows an exemplary ink cartridge according to the present invention.

An aspect of the inventive ink cartridge will be explained with reference to FIG. 6. The ink cartridge 1 shown in FIG. 6 comprises an ink bag 2 which encloses recording ink and a housing 3 which encases the ink bag 2. The ink bag 2 formed of aluminum laminate film, which is flexible and substantially rectangular, is filled with the inventive recording ink and is encased in the housing 3. The housing 3 is consisted of the first housing part 11, the second housing part 12 and the third housing part 13. In the ink cartridge 1, the first housing part 11 and the second housing part 12 are screwed and fixed by means of screw member 82. In FIG. 6, reference number 25 represents the ink feeding inlet, 44 and 45 represent guide for inserting a cartridge, 64 represents a guide for defining color to mount the cartridge correctly.

The ink cartridge according to the present invention may be mounted and applied to various inkjet recording apparatuses in a manner that permits the installation and removal, preferably, is mounted and applied to the inventive inkjet recording apparatus in a manner that permits the installation and removal.

(Inkjet Recording Apparatus and Inkjet Recording Process)

The inkjet recording apparatus according to the present invention comprises at least a unit for discharging ink drops, and the other units selected properly depending on the requirements such as impulse generating unit, controlling unit or the like.

The inkjet recording process according to the present invention comprises at least discharging ink drops, and the others selected properly depending on the requirements such as impulse generating, controlling or the like.

The inkjet recording process according to the present invention may be preferably performed by means of the inkjet recording apparatus according the present invention; and the others may be preferably performed by means of other units.

Process for Discharging Ink Drops and Unit for Discharging Ink Drops

In the process for discharging ink drops, impulses are applied to the inventive recording ink, then ink drops are discharged to form an image.

In the unit for discharging ink drops, impulses are applied to the inventive recording ink, then ink drops are discharged to form an image. The unit for discharging ink drops may be selected without particular restrictions, for example, include various nozzles for discharging ink.

In carrying out the present invention, preferably, at least a part of the liquid room portion, flow resisting portion, vibrating plate, and nozzle member of the inkjet head is formed of a material containing silicon or nickel.

Preferably, the inlet diameter of the inkjet nozzle is 30 μm or less, more preferably 1 μm to 20 μm.

The above-noted impulse may be generated through the above-noted impulse generating unit for example. The impulse may be properly selected without particular limitations; for example, the impulse may be of heat (temperature), pressure, vibration, radiation and the like. These may be employed in single or in combination. Among these, heat and pressure are preferred.

Specifically, examples of the impulse generating unit include a heating device, pressure device, piezoelectric element, vibration generating device, ultrasonic generating device, light and the like, more specifically, piezoelectric actuator such as piezoelectric element, thermal actuator based on phase-change of film between liquid and vapor by means of electothermal element such as heating resistor, shape memory alloy actuator based on phase-change depending on temperature, electrostatic actuator based on electrostatic power and the like are exemplified.

The process for discharging ink drops may be properly selected depending on the aforesaid impulse without particular limitations. In the case that the impulse is of "heat", such process is exemplified as thermal energy corresponding to the recording signal is applied on the recording ink in the recording head by means of a thermal head, then bubbles are generated in the recording ink through the thermal energy, thereby the recording ink is ejected from the nozzle of the recording head in a form of ink drops owing to the pressure of bubbles. Alternatively, in the case that the impulse is of "pressure", such process is exemplified as a voltage is applied to a piezoelectric element which is disposed and adhered in so-called pressure room on the way of ink passage in the recording head, as a result the piezoelectric element is deflected thereby the volume of the pressure room is reduced, then the recording ink is ejected from the nozzle of the recording head in a form of ink drops.

The size of drops of discharged recording ink is preferably 3 to 40 pl, the velocity of the ejected drops is preferably 5 to 20 m/sec., the driving frequency is preferably 1 kHz or more, and the resolution is preferably 300 dpi or more.

The aforesaid controlling unit may be properly selected depending on the application without particular limitations, as long as the respective units may be ordinarily controlled; for example such instrument as sequencer, computer and the like may be utilized.

Figure 7:
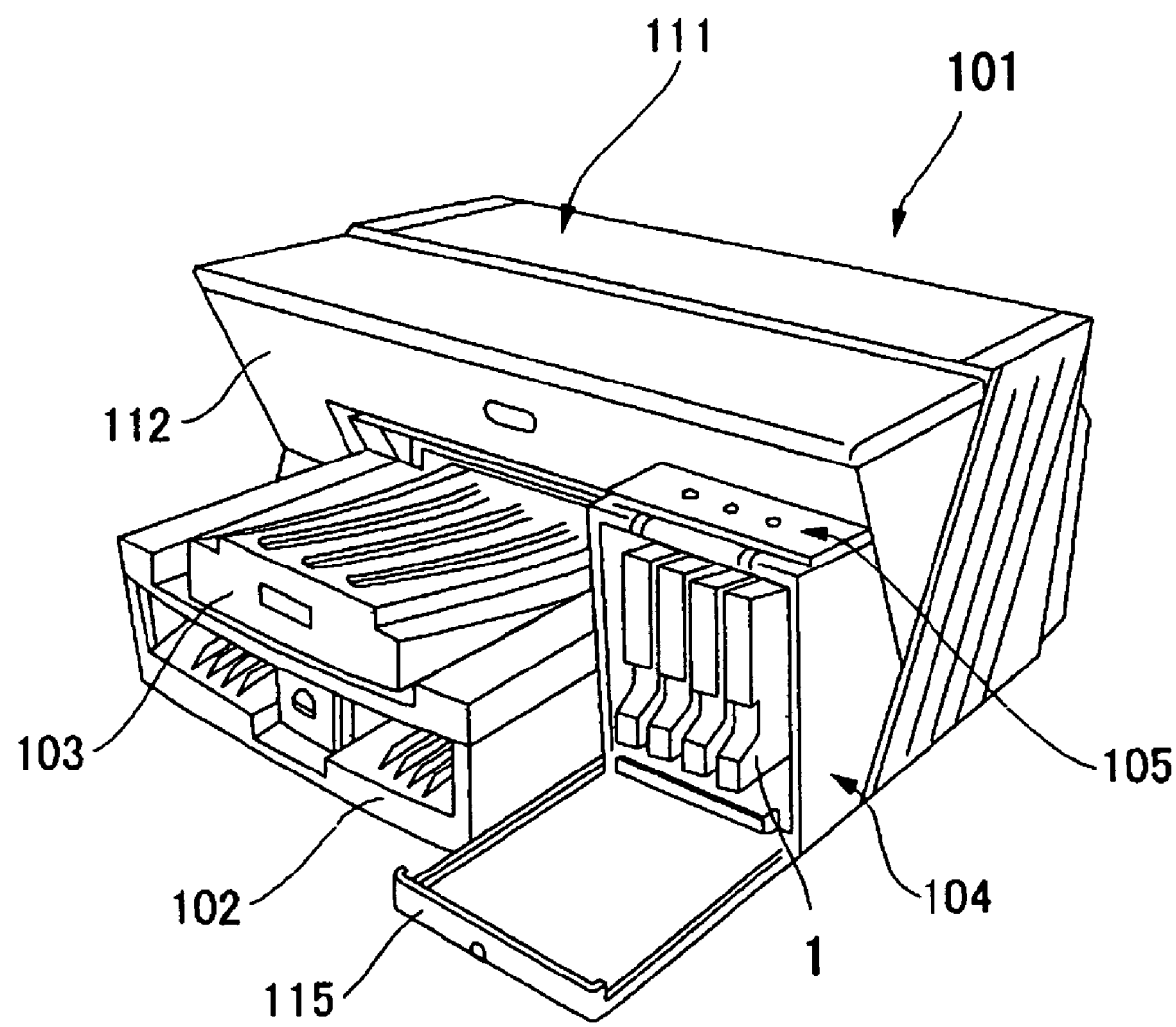
FIG. 7 schematically shows an exemplary inkjet recording apparatus according to the present invention.

An aspect of the inventive inkjet recording process that utilizes the inventive inkjet recording apparatus will be explained with reference to Figures. The inkjet recording apparatus shown in FIG. 7 comprises main body 101, paper feeding tray 102 mounted on the main body 101 for charging paper, paper discharging tray 103 mounted on the main body 101 for stocking the image-recorded (formed) paper, and ink cartridge mounting portion 104. On the upper side of ink cartridge mounting portion 104, operating portion 105 equipped with an operating key and display and the like is arranged. The ink cartridge mounting portion 104 comprises closing-opening front cover 115 in order to install and remove ink cartridge 1. The upper cover is denoted by 111, and the front face is denoted by 112.

Figure 8:
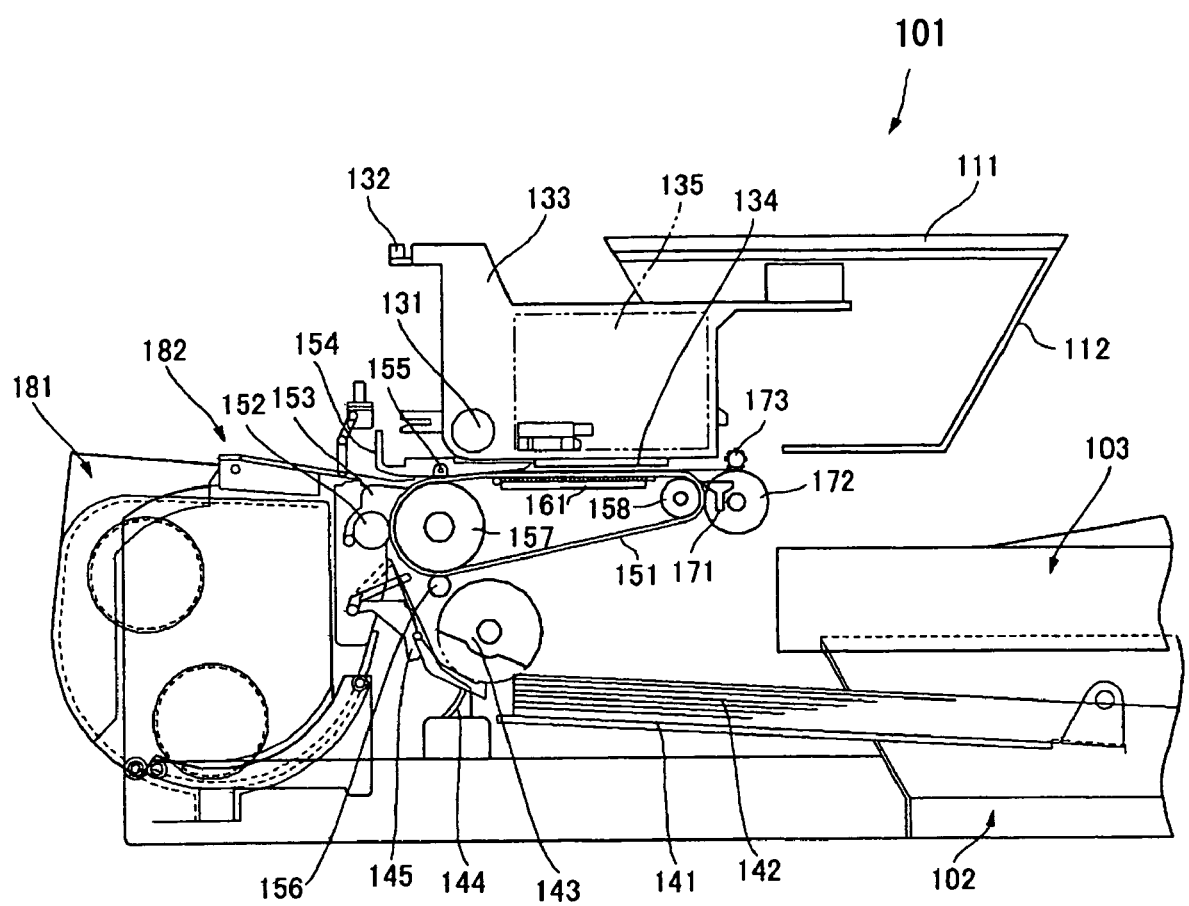
FIG. 8 schematically shows an exemplary internal constitution of inkjet recording apparatus of FIG. 7.
Figure 9:
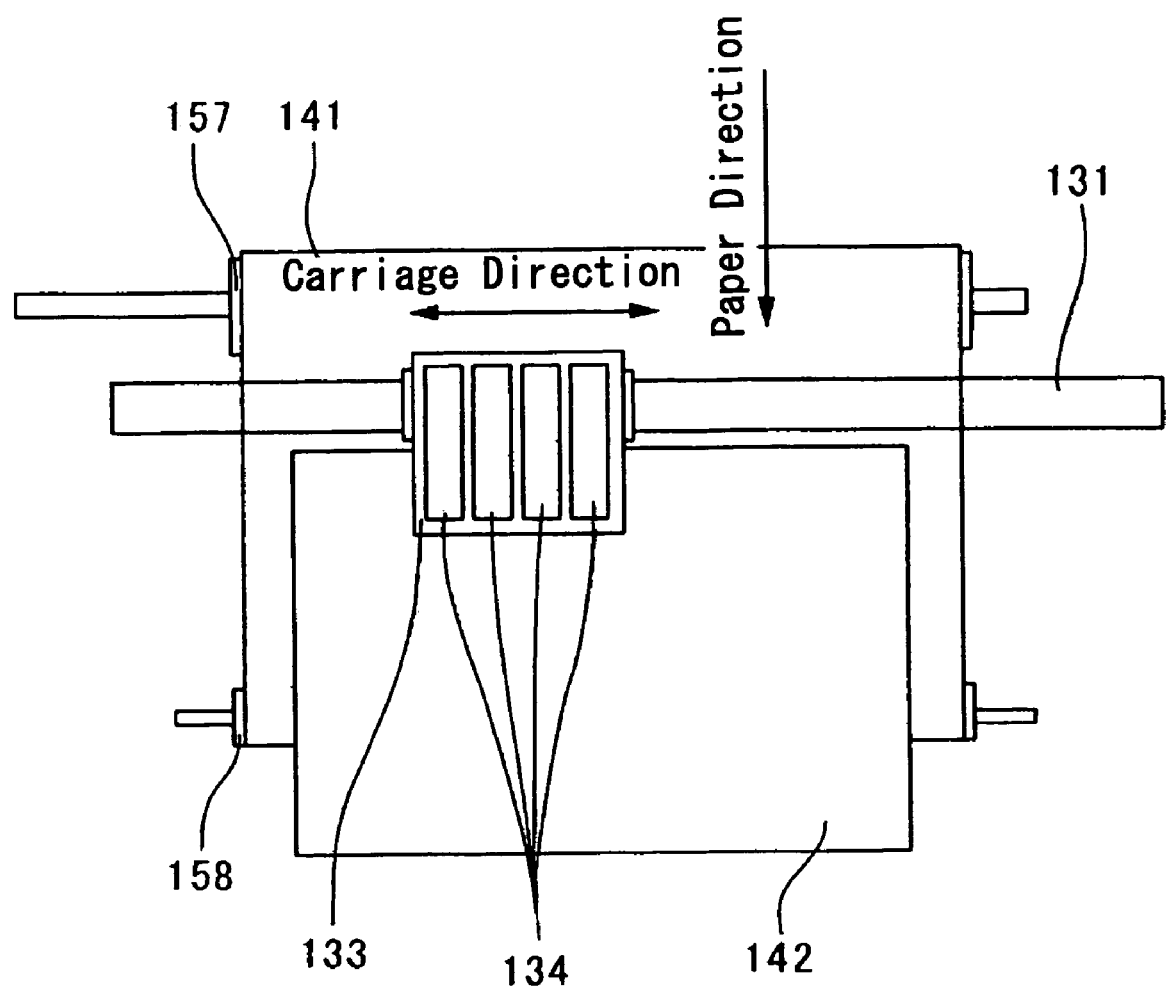
FIG. 9 is a schematic plan view showing an exemplary internal constitution of inkjet recording apparatus of FIG. 7.

In the main body 101, as shown in FIGS. 8 and 9, carriage 133 is supported by guide rod 131, sustained by the right and left side plates (not shown), and stay 132 as supporting members, such that carriage 133 may freely slide in the main scanning direction, and may be scanned by a main scanning motor (not shown) in the direction indicated by the arrow in FIG. 9.

Carriage 133 comprises recording head 134, equipped with four inkjet recording heads that discharge the respective recording ink drops of yellow (Y), cyan (C), magenta (M) and black (BK), wherein recording head 134 is mounted such that the respective ink outlets cross with the direction of main scanning, and the discharged inks travel downward.

The inkjet recording head of recording head 134 may comprise an energy generating unit for discharging the recording ink, for example, a piezoelectric actuator such as piezoelectric element, thermal actuator based on phase-change of film between liquid and vapor by means of electothermal element such as heating resistor, shape memory alloy actuator based on phase-change depending on temperature, and electrostatic actuator based on electrostatic power.

Further, color-identified sub-tanks 135 for supplying color-identified inks to the recording head 134 are mounted on carriage 133. The inventive recording inks is fed and supplied to sub-tanks 135 from inventive cartridge 1, mounted on ink cartridge mounting portion 104, through a recording ink supplying tube (not shown).

On the other hand, the paper feeding portion for feeding accumulated paper 142 on paper accumulating portion 141 of paper feeding tray 103 comprises a half-moon roller (paper feeding roller 143) and separating pad 144, in which the half-moon roller feeds paper separately one by one from paper accumulating portion 141, separating pad 144 is disposed oppositely to paper feeding roller 143 and is formed of a material with relatively higher friction coefficient, and separating pad 144 is pressed toward paper feeding roller 143.

The transporting portion, which transport paper 142 from the paper feeding portion at the space below recording head 134, comprises transporting belt 151 that attract paper 142 by electrostatic effect and transport it; counter roller 152 that transports paper 142 from the paper feeding portion through guide 145 by pinching with transporting belt 151; transporting guide 153 to accommodate paper 142, transported approximately in vertical direction, to transporting belt 151 with about 90 degrees of direction change; and top pressing roller 155 that is pressed toward transporting belt 151 by pressing member 154; and also electrifying roller 156 that electrifies the surface of transporting belt 151.

Transporting belt 151 is an endless belt that is spanned over transporting roller 157 and tension roller 158 and is able to rotate in the transporting direction of belt. At the back side of transporting belt 151, guide member 161 is disposed at the corresponding region with the printing region by recording head 134. Further, the paper discharging portion that discharges paper 142 recorded by recording head 134 comprises separating pawl 171 for separating paper 142 from transporting belt 151, paper discharging roller 172, and paper discharging roller 173. Paper discharging tray 103 is disposed below paper discharging roller 172.

At the back side of main body 101, double-side paper feeding unit 181 is mounted in a manner that permits the installation and removal. Double-side paper feeding unit 181 entraps paper 142 returned by reverse rotation of transporting belt 151, turn over it, then feed it again between counter roller 152 and transporting belt 151. By the way, manual paper feeding portion 182 is provided over double-side paper feeding unit 181.

In the inkjet recording apparatus, paper is fed separately one by one from paper feeding portion, paper 142 fed in approximately vertical direction is directed by guide 145, and transported while being pinched between transporting belt 151 and counter roller 152. Then, paper 142 is guided at the leading end by transporting guide 153, is pressed on transporting belt 151 by tip pressing roller 155, and the transporting direction is turned about 90 degrees.

At this stage, transporting belt 151 is electrified by electrifying roller 156, thereby paper 142 is transported in a condition being electrostatically attached to the transporting belt 151. Then, through driving the recording head 134 in accordance with the image signals along with moving carriage 133, one line image may be recorded through discharging ink drops onto stationary paper 142, then paper 142 is moved in pre-determined distance, and the next line is recorded. When the signal of final record or the signal of the tailing end being arrived at the recording region is received, the recording operation is ceased, and paper 142 is removed into discharging paper tray 103.

Further, when the recording ink remained in the sub-tank 135 is detected to be nearly depleted, the required amount of recording ink is supplied into sub-tank 135 from ink cartridge 1.

In the inkjet recording apparatus, when the recording ink in the inventive ink cartridge 1 is consumed completely, only ink bag 2 in the ink cartridge 1 is exchanged through decomposing housing 3 of ink cartridge 1. Alternative constructions of ink cartridge such as of upright or front injection allow stable feed of recording ink. Therefore, even in the cases that the inventive apparatus is seated in a condition as the upper space of the main body 101 is occupied with something, for example, even when the inventive apparatus is enclosed in a lack or some object is disposed on the main body, the ink cartridge 1 may be replaced easily.

By the way, although the examples of the present invention are those applied to Serial type (Shuttle type) inkjet recording apparatus hereinbefore, the present invention is similarly applicable to Line type inkjet recording apparatus equipped with a line type head.

In addition, the inkjet recording apparatus and inkjet recording process according to the present invention may be applied to various recording based on inkjet recording, for example, to printers for inkjet recording, facsimile, copier, complex apparatus of printer/facsimile/copier.

The recording apparatus according to the present invention will be explained in the following.

Figure 10:
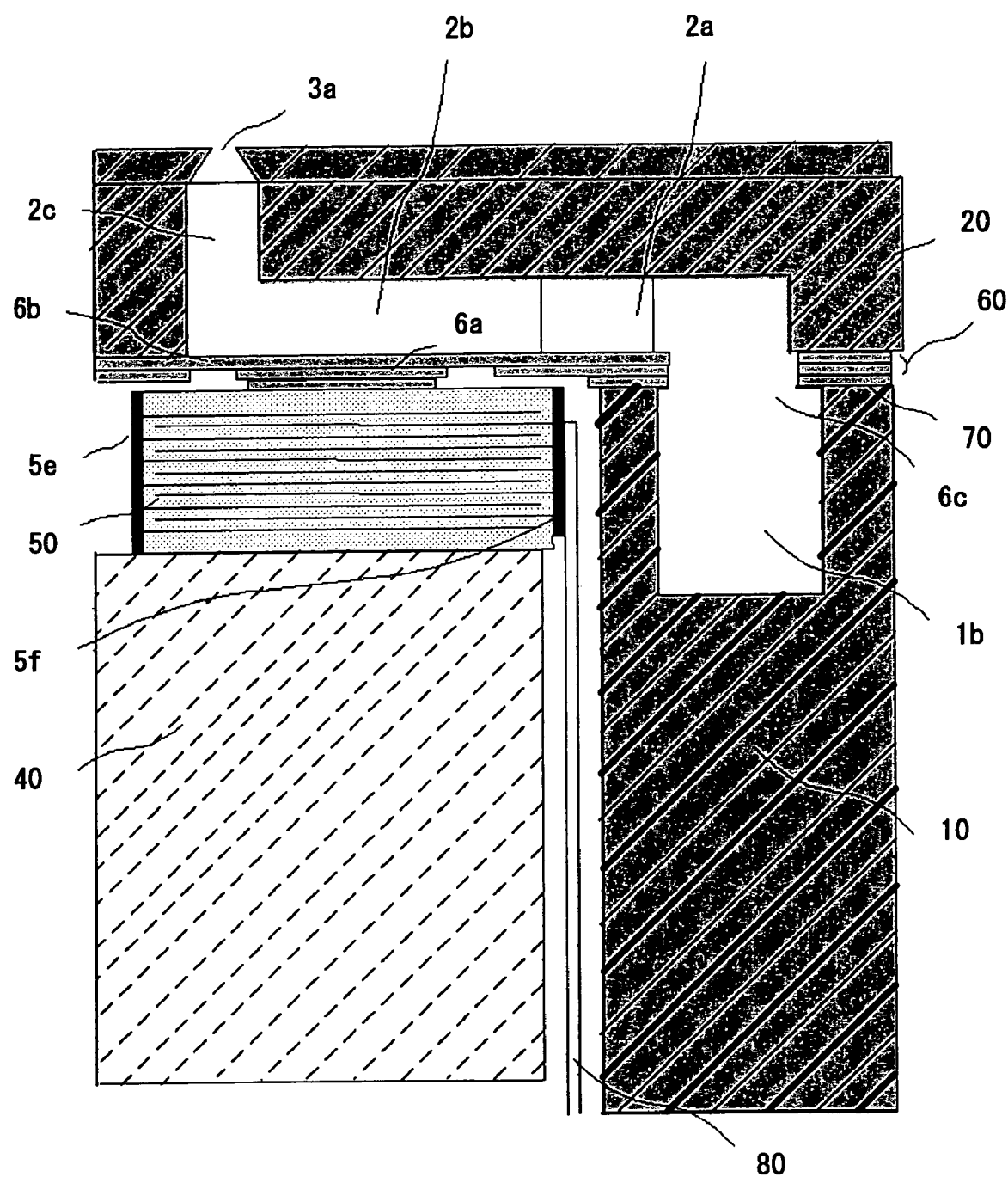
FIG. 10 shows a partially enlarged view of an inkjet head related to the present invention.
Figure 11:
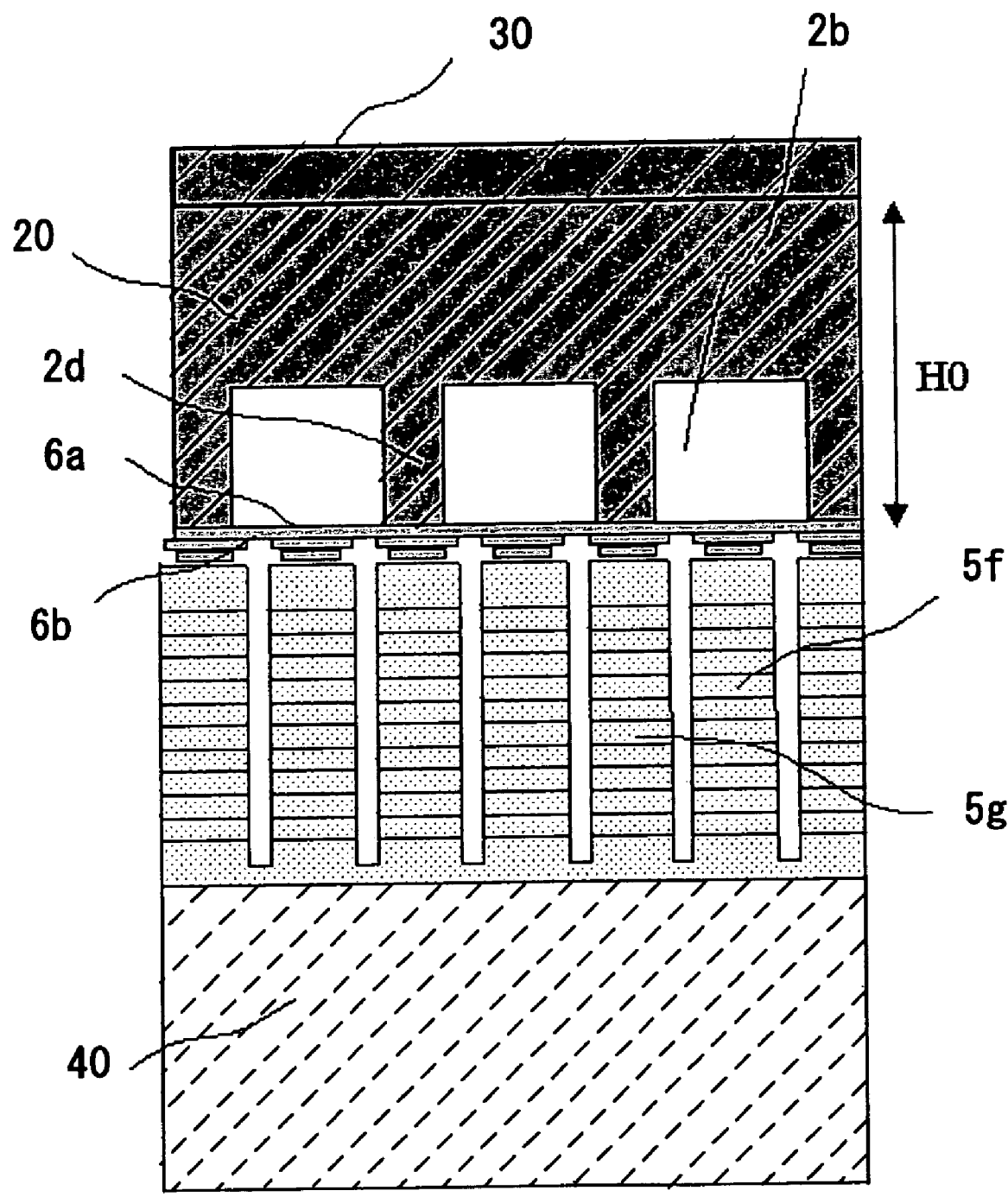
FIG. 11 is a cross-section view of the inkjet head, partially enlarged in the direction of channels, related to the present invention.

FIG. 10 shows a partially enlarged view of an inkjet head according to the present invention, FIG. 11 is a cross-section view of the inkjet head partially enlarged in the direction of channels.

The inkjet head comprises flame 10, which is formed a texture intended to provide a common liquid room 1b with an ink inlet (not shown); passage plate 20, which is formed a texture intended to form flow resisting part 2a and pressuring liquid room 2b, and connecting aperture 2c to communicate with nozzle 3a; a nozzle plate which forms nozzle 3a; vibrating plate 60 comprising convex part 6a, diaphragm part 6b and ink inlet 6c; laminated piezoelectric element 50 bonded to the vibrating plate through adhesive layer 70; and base 40 which fixes laminated piezoelectric element 50. Base 40 is formed of barium titanate ceramic and two rows of laminated piezoelectric elements 50 are disposed and bonded.

The piezoelectric element 50 is formed by alternatively laminating piezoelectric layers (not shown) of 10 to 50 μm thick/layer comprised of lead zirconate tiatanate and internal electrode layers (not shown) of several μm thick/layer composed of silver/palladium (AgPd). The internal electrodes (not shown) are connected to outer electrodes (not shown) at their both ends.

The piezoelectric elements 50 are divided into a ctenidium shape through half-cut dicing processing to be utilized as driving part 5f and supporting part 5g alternatively.

The outside of the outer electrode (not shown) is limited in its length by subjecting a processing such as cutoff so as to be divided through a half-cut dicing processing, and these are rendered independent electrodes. The other maintains electric continuity without being divided through the dicing processing, and rendered common electrode 5e.

To the independent electrode (not shown) of the driving part, EPC 80 is bonded with soft solder. Further, the common electrode 5e is connected around to Gnd electrode of FPC 80 by providing electrode layer at the end of the laminated piezoelectric element. To the FPC 80, a driver IC (not shown) is mounted, thereby the application of driving voltage to the driving part 5f is controlled.

The vibrating plate 60 is formed from diaphragm part 6b of thin film; island-like convex part 6a (island part), which is formed on the central part of diaphragm part 6b and which is connected to the laminated piezoelectric element 50 intended to be driving part 5f; thick film part containing a beam connected to a support part (not shown); and an aperture for an ink inlet 6c which is coated with two layers of Ni-plate through an elecroforming processing. As for the diaphragm part, the thickness is 3 μm, the width is 35 μm (one side).

The bonding between island-like convex part 6a of vibrating plate 60 and driving part 5f of piezoelectric element 50 is achieved through patterned adhesive layer 70 containing a gap material.

Passage plate 20 is formed of silicon single crystal. In the silicon single crystal, grooves and penetrations were patterned through an etching processing, wherein the grooves are intended to form flow resisting part 2a and pressuring liquid room 2b; and the penetrations are intended to form connecting inlet 2c at the position corresponding to nozzle 3a.

The remained part after etching forms division wall 2d of pressuring liquid room 2b. In the configuration of the head, flow resisting part 2a is provided by partially narrowing the etched width.

Nozzle plate 30 is formed of metal material such as Ni-plate film through an elecroforming processing, and possesses a number of nozzles 3a which act as fine outlets to discharge ink drops. The inside structure or interior shape is horn-like, wherein column-like or cone-like shape is also allowable. The size of nozzle 3a is about 20 to 35 μm as the diameter at the ink drop outlet. The nozzle pitch of the respective lines is 150 dpi.

On the surface of the ink discharging side of the nozzle plate 30, a water-repellent layer (not shown) is provided. The surface treating on the water-repellent layer is, for example, PTFE-Ni co-precipitation plating, electrodeposition coating of fluoride resin, vapor deposition coating of vaporizable fluoride resin such as fluorinated pitch, baking of silicone resin or fluoride resin flowing coating with solvent, and the like. Such surface treating may be selected depending on the ink properties so as to stabilize the drop shape, discharging property, thereby to achieve high quality images.

Flame 10 is produced through resin molding to which grooves are formed for the ink inlet (not shown) and common liquid room 1b.

In the inkjet nozzle of above explained construction, displacements are generated at driving part 5f in the laminated direction, due to applying driving waveform (pulse voltage of 10 to 50 V) on driving part 5f depending on the recording signals, thereby pressuring liquid room 2b is pressurized to increase the pressure through vibrating plate 30, and ink drops are discharged from nozzle 3a.

When the discharging of ink drops is stopped, the ink pressure within pressuring liquid room 2b decreases, and negative pressure is generated in pressuring liquid room 2b through the inertia of ink flow and electric discharge of driving pulse, transferring into filling stage of ink. That is, the ink fed from the ink tank flows into common liquid room 1b, and flows from common liquid room 1b to flow resisting part 2a through ink flow inlet 6c, then filled in pressuring liquid room 2b.

Flow resisting part 2a provides an effect on attenuating the residual pressure vibration after discharging, whereas it disturbs refilling due to the surface tension. Accordingly, the attenuation of residual pressure and the period for refilling may be well balanced, and the cyclic period between the ink discharging action or running period may be shortened by properly selecting the flow resisting part.

Effect of Invention

As above explained specifically and closely, in accordance with the present invention, an inkjet recording ink comprising a colorant dispersible in water, a humectant, a surfactant, and a wetting agent is provided, wherein the inkjet recording ink is formulated such that the viscosity increases rapidly while the evaporated moisture content is 30 to 45% by weight, i.e. the rate of viscosity increase exceeds 50 mPa·s/%, thereby high quality images may be formed even on plain paper. Further, by means of designing the ink such that the alternation of average particle size is reduced even at the stage when a rapid viscosity increase appears, the reliability on short and long periods may be assured. In addition, by employing the recording process and recording apparatus according to the present invention, image formation may be possible with higher discharging stability and higher quality.

What is claimed is:

1. A recording ink comprising a colorant dispersible in water, a humectant, a surfactant, and a wetting agent,
   wherein the rate of viscosity increase associated with evaporation of moisture in the recording ink is 5.0 mPa·s/% or less while the evaporated moisture content is less than 30% by weight based on the whole weight of the recording ink,
   the rate of viscosity increase associated with evaporation of moisture exceeds 50 mPa·s/% while the evaporated moisture content is 30 to 45% by weight, and
   the average particle size of the colorant in the recording ink is less than five times the average particle size of the colorant in the initial recording ink and is 0.8 μm or less, at the stage of the recording ink when the rate of viscosity increase amounts to 50 mPa·s/%,
   wherein the rate of viscosity increase associated with evaporation of moisture (mPa·s/%) is defined as the increment of viscosity (mPa·s) versus the increment of evaporated moisture content (%).

2. The recording ink according to claim 1, wherein the recording ink comprises 3 to 15% by weight of the colorant, 10 to 40% by weight of the humectant, 0.01 to 5% by weight of the surfactant, and 0.1 to 4.0% by weight of the wetting agent.

3. The recording ink according to claim 1, wherein the colorant is a pigment processed to be dispersible in water with no dispersant, owing to at least one kind of hydrophilic group being attached, directly or with other intervening atomic groups, to the surface of the pigment.

4. The recording ink according to claim 1, wherein the colorant is a pigment dispersed with at least one of surfactants and polymer dispersants.

5. The recording ink according to claim 1, wherein the colorant is a polymer emulsion formed by incorporating water-insoluble or hardly water-soluble color material into polymer fine particles.

6. The recording ink according to claim 1, wherein the humectant comprises two or more kinds of multivalent alcohols that respectively exhibit 25% or more by weight of equivalent moisture in a condition of 20° C. temperature and 60% relative humidity.

7. The recording ink according to claim 6, wherein one of the multivalent alcohols is glycerin and the content of glycerin is 20% by weight to 80% by weight based on the whole humectant.

8. The recording ink according to claim 1, wherein the wetting agent comprises at least one of polyol that exhibits a solubility of 0.2% by weight or more and less than 5.0% by weight against water at 20° C.

9. The recording ink according to claim 8, wherein the polyol is 2-ethyl-1,3-hexanediol.

10. The recording ink according to claim 8, wherein the polyol is 2,2,4-trimethyl-1,3-pentanediol.

11. The recording ink according to claim 1, wherein a pigment-coagulation inhibitor is further incorporated.

12. An ink cartridge containing a recording ink, comprising a colorant dispersible in water, a humectant, a surfactant, and a wetting agent, wherein the rate of viscosity increase associated with evaporation of moisture in the recording ink is 5.0 mPa·s/% or less while the evaporated moisture content is less than 30% by weight based on the whole weight of the recording ink, the rate of viscosity increase associated with evaporation of moisture exceeds 50 mPa·s/% while the evaporated moisture content is 30 to 45% by weight, and the average particle size of the colorant in the recording ink is less than five times the average particle size of the colorant in the initial recording ink and is 0.8 μm or less, at the stage of the recording ink when the rate of viscosity increase amounts to 50 mPa·s/%, wherein the rate of viscosity increase associated with evaporation of moisture (mPa·s/%) is defined as the increment of viscosity (mPa·s) versus the increment of evaporated moisture content (%).

13. An inkjet recording process, comprising:

discharging a recording ink toward printable area or non-printing area before evaporated moisture content of the recording ink exceeds 30% by weight based on whole weight of the recording ink around the site of the nozzle, wherein the recording ink comprises a colorant dispersible in water, a humectant, a surfactant, and a wetting agent, the rate of viscosity increase associated with evaporation of moisture in the recording ink is 5.0 mPa·s/% or less while the evaporated moisture content is less than 30% by weight based on the whole weight of the recording ink, the rate of viscosity increase associated with evaporation of moisture exceeds 50 mPa·s/% while the evaporated moisture content is 30 to 45% by weight, and the average particle size of the colorant in the recording ink is less than five times the average particle size of the colorant in the initial recording ink and is 0.8 μm or less, at the stage of the recording ink when the rate of viscosity increase amounts to 50 mPa·s/%, wherein the rate of viscosity increase associated with evaporation of moisture (mPa·s/%) is defined as the increment of viscosity (mPa·s) versus the increment of evaporated moisture content (%).

14. The inkjet recording process according to claim 13, wherein the volume of ink drops discharged from the nozzle is 3 to 40 pico-liter, the velocity of the ink drops is 6 to 20 m/sec, the frequency is 1 kHz or more, and the resolution is 300 dots per inch.

15. A recording apparatus comprising a recording head, wherein the recording head is comprised of plural pressuring liquid rooms, nozzles with no more than 35 μm apertures that communicate to the pressuring liquid room, ink supplying passage(s), vibrating plate(s), and an electro-mechanical transforming unit to displace the vibrating plate, a recording ink is charged in the recording apparatus, wherein the recording ink comprises a colorant dispersible in water, a humectant, a surfactant, and a wetting agent, the rate of viscosity increase associated with evaporation of moisture in the recording ink is 5.0 mPa·s/% or less while the evaporated moisture content is less than 30% by weight based on the whole weight of the recording ink, the rate of viscosity increase associated with evaporation of moisture exceeds 50 mPa·s/% while the evaporated moisture content is 30 to 45% by weight, and the average particle size of the colorant in the recording ink is less than five times the average particle size of the colorant in the initial recording ink, and is 0.8 μm or less, at the stage of the recording ink when the rate of viscosity increase amounts to 50 mPa·s/%, wherein the rate of viscosity increase associated with evaporation of moisture (mPa·s/%) is defined as the increment of viscosity (mPa·s) versus the increment of evaporated moisture content (%).

16. The recording apparatus according to claim 15, wherein discharging a recording ink toward printable area or non-printing area before evaporated moisture content of the recording ink exceeds 30% by weight based on whole weight of the recording ink around the site of the nozzle, thereby forming color images.

* * * * *